(12) United States Patent
Tsukuba

(10) Patent No.: US 12,192,462 B2
(45) Date of Patent: Jan. 7, 2025

(54) IMAGE PROCESSING DEVICE AND METHOD

(71) Applicant: Sony Group Corporation, Tokyo (JP)

(72) Inventor: Takeshi Tsukuba, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 249 days.

(21) Appl. No.: 17/775,583

(22) PCT Filed: Dec. 11, 2020

(86) PCT No.: PCT/JP2020/046263
§ 371 (c)(1),
(2) Date: May 10, 2022

(87) PCT Pub. No.: WO2021/117866
PCT Pub. Date: Jun. 17, 2021

(65) Prior Publication Data
US 2022/0394256 A1 Dec. 8, 2022

Related U.S. Application Data

(60) Provisional application No. 62/947,304, filed on Dec. 12, 2019.

(51) Int. Cl.
*H04N 19/00* (2014.01)
*H04N 19/12* (2014.01)
(Continued)

(52) U.S. Cl.
CPC ........... *H04N 19/12* (2014.11); *H04N 19/124* (2014.11); *H04N 19/156* (2014.11);
(Continued)

(58) Field of Classification Search
CPC .... H04N 19/12; H04N 19/124; H04N 19/156; H04N 19/157; H04N 19/186; H04N 19/46; H04N 19/61; H04N 19/625
See application file for complete search history.

(56) References Cited

U.S. PATENT DOCUMENTS

2022/0353505 A1* 11/2022 Kim ..................... H04N 19/176
2022/0394311 A1* 12/2022 Rosewarne .......... H04N 19/119
(Continued)

OTHER PUBLICATIONS

Saxena Ankur et al: "Low Latency Secondary Transforms for Intra/Inter Prediction Residual", IEEE Transactions on Image Processing, IEEE, USA, vol. 22, No. 10, Oct. 1, 2013 (Oct. 1, 2013), pp. 4061-4071, XP011525929, ISSN: 1057-7149, DOI: 10.1109/TIP.2013.2270087 [retrieved on Sep. 5, 2013].

(Continued)

*Primary Examiner* — Zhihan Zhou
(74) *Attorney, Agent, or Firm* — XSENSUS LLP

(57) ABSTRACT

The present disclosure relates to an image processing device and method for enabling suppression of an increase in encoding load.
An encoding mode of encoding of an image is set by setting a transform type with a minimum encoding cost in a non-joint chrominance encoding mode as a transform type in a joint chrominance encoding mode, and deriving an encoding cost in the joint chrominance encoding mode. The present disclosure can be applied to, for example, an image processing device, an image encoding device, an information processing device, an electronic device, an image processing method, an information processing method, or the like.

14 Claims, 9 Drawing Sheets

(51) Int. Cl.
  *H04N 19/124* (2014.01)
  *H04N 19/156* (2014.01)
  *H04N 19/157* (2014.01)
  *H04N 19/186* (2014.01)
  *H04N 19/46* (2014.01)
  *H04N 19/61* (2014.01)
  *H04N 19/625* (2014.01)

(52) U.S. Cl.
  CPC ......... *H04N 19/157* (2014.11); *H04N 19/186* (2014.11); *H04N 19/46* (2014.11); *H04N 19/61* (2014.11); *H04N 19/625* (2014.11)

(56) References Cited

U.S. PATENT DOCUMENTS

2023/0007263 A1* 1/2023 Kang .................. H04N 19/159
2023/0037302 A1* 2/2023 Rosewarne .......... H04N 19/136

OTHER PUBLICATIONS

International Search Report and Written Opinion mailed on Mar. 2, 2021, received for PCT Application PCT/JP2020/046263, Filed on Dec. 11, 2020, 8 pages including English Translation.

Ray et al., "On the combination of JCCR and TS", Joint Video Experts Team (JVET) of ITU-T SG 16 WP 3 and ISO/ IEC JTC 1/SC 29/WG 11, JVET-Q408-v2, Jan. 7-17, 2020, pp. 1-8.

Bross et al., "Versatile Video Coding (Draft 7)", Joint Video Experts Team (JVET) of ITU-T SG 16 WP 3 and ISO/ IEC JTC 1/SC 29/WG 11, JVET-P2001 (version 14), Oct. 1-11, 2019, pp. 1-465.

Bross et al., "Versatile Video Coding (Draft 7)", JVET-P2001-vE, Joint Video Experts Team (JVET) of ITU-T SG 16 WP 3 and ISO/IEC JTC 1/SC 29/WG 11, Oct. 1-11, 2019, 9 pages.

Helmrich et al., CE7-related: Joint chroma residual coding with multiple modes, Joint Video Experts Team (JVET) of ITU-T SG 16 WP 3 and ISO/IEC JTC 1/SC 29/WG 11, JVET-N0282-v3, Mar. 19-27, 2019, pp. 1-10.

Chen et al., "Algorithm description for Versatile Video Coding and Test Model 7 (VTM 7)", JVET-P2002-v1, Joint Video Experts Team (JVET) of ITU-T SG 16 WP 3 and ISO/IEC JTC 1/SC 29/WG 11, Oct. 1-11, 2019, pp. 1-89.

Tsukuba et al., "CE8-2.1: Transform Skip for Chroma with limiting maximum number of context-coded bin in TS residual coding", Joint Video Experts Team (JVET) of ITU-T SG 16 WP 3 and ISO/IEC JTC 1/SC 29/WG 11, JVET-P0058-v2, Oct. 1-11, 2019, pp. 1-10.

Tsukuba et al., "On Transform Skip in JointCbCr mode", Joint Video Experts Team (JVET) of ITU-T SG 16 WP 3 and ISO/IEC JTC 1/SC 29/WG 11, JVET-Q0101-v1, Jan. 7-17, 2020, pp. 1-6.

Xiu et al., "AHG11: Encoder improvements on JCCR with chroma transform skip mode", Joint Video Experts Team (JVET) of ITU-T SG 16 WP 3 and ISO/IEC JTC 1/SC 29/WG 11, JVET-Q0514_r1, Jan. 7-17, 2020, pp. 1-5.

"Advanced video coding for generic audiovisual services", Series H: Audiovisual and Multimedia Systems ITU-T, Telecommunication Standardization Sector of ITU, H.264, Apr. 2017, pp. 1-787.

"High efficiency video coding", Series H: Audiovisual and Multimedia Systems, ITU-T, Telecommunication Standardization Sector of ITU, H.265, Dec. 2016, pp. 1-643.

* cited by examiner

| if(tu_cbf_cb[xC][yC] && treeType != DUAL_TREE_LUMA) { | |
| --- | --- |
| if(sps_transform_skip_enabled_flag && !BdpcmFlag[x0][y0][1] && wC <= MaxTsSize && hC <= MaxTsSize && !cu_sbt_flag) | |
| transform_skip_flag[xC][yC][1] | ae(v) |

B

| if(tu_cbf_cr[xC][yC] && treeType != DUAL_TREE_LUMA && !(tu_cbf_cb[xC][yC] && tu_joint_cbcr_residual_flag[xC][yC])) { | |
| --- | --- |
| if(sps_transform_skip_enabled_flag && !BdpcmFlag[x0][y0][2] && wC <= MaxTsSize && hC <= MaxTsSize && !cu_sbt_flag) | |
| transform_skip_flag[xC][yC][2] | ae(v) |

C

| JOINT CHROMINANCE ENCODING MODE tu_joint_cbcr_residual_flag | SELECTABLE TRANSFORM TYPE trType |
| --- | --- |
| 0 | DCT2, TS |
| 1 | DCT2 |

D

| JOINT CHROMINANCE ENCODING MODE tu_joint_cbcr_residual_flag | SELECTABLE TRANSFORM TYPE trType |
| --- | --- |
| 0 | DCT2, TS |
| 1 | DCT2, TS |

FIG. 2

```
transform_skip_flag[codedCIdx] in JointCbCr mode=bestTsFlag[codedCIdx] in non-JointCbCr mode,
where codedCIdx= (TuCResMode[xTbY][yTbY] ==1 || TuCResMode[xTbY][yTbY] ==2) ?1:2.
```

IMAGE PROCESSING DEVICE AND METHOD

CROSS-REFERENCE TO RELATED APPLICATIONS

The present application is based on PCT filing PCT/JP2020/046263, filed Dec. 11, 2020, which claims priority to U.S. Provisional Application No. 62/947,304, filed Dec. 12, 2019, the entire contents of each are incorporated herein by reference.

TECHNICAL FIELD

The present disclosure relates to an image processing device and method, and particularly to an image processing device and method capable of suppressing an increase in encoding load.

BACKGROUND ART

In the past, there has been proposed an encoding method for deriving a prediction residual of a moving image, performing coefficient transform, quantizing, and encoding (see, for example, Non-Patent Document 1 and Non-Patent Document 2). In versatile video coding (VVC) working draft described in Non-Patent Document 1, chrominance transform skip can be applied regardless of a joint chrominance encoding mode (joint CbCr mode). Meanwhile, in implementation of VVC VTM software described in Non-Patent Document 2, application of the chrominance transform skip is limited in the joint chrominance encoding mode.

In the case of limiting the application of the chrominance transform skip in the joint chrominance encoding mode as described in Non-Patent Document 2, signaling of the transform skip flag in the joint chrominance encoding mode is unnecessary. That is, due to the signaling of the transform skip flag in the joint chrominance encoding mode, a code amount may have been unnecessarily increased, and encoding efficiency may have been reduced. That is, there has been a possibility that the encoding efficiency is reduced. In contrast, in the case of the method described in Non-Patent Document 1, the application of the chrominance transform skip is not limited in the joint chrominance encoding mode, and thus reduction in the encoding efficiency due to redundancy of the transform skip flag is suppressed.

CITATION LIST

Non-Patent Document

Non-Patent Document 1: Benjamin Bross, Jianle Chen, Shan Liu, Ye-Kui Wang, "Versatile Video Coding (Draft 7)", JVET-P2001-vE, Joint Video Experts Team (JVET) of ITU-T SG 16 WP 3 and ISO/IEC JTC 1/SC 29/WG 11 16th Meeting: Feneva, CH, 1-11 Oct. 2019

Non-Patent Document 2: Jianle Chen, Yan Ye, Seung Hwan Kim, "Algorithm description for Versatile Video Coding and Test Model 7 (VTM 7)", JVET-P2002-v1, Joint Video Experts Team (JVET) of ITU-T SG 16 WP 3 and ISO/IEC JTC 1/SC 29/WG 11 16th Meeting: Geneva, CH, 1-11 Oct. 2019

SUMMARY OF THE INVENTION

Problems to be Solved by the Invention

However, in the case of the method described in Non-Patent Document 1, it is necessary to evaluate both the case of applying the transform skip and the case of not applying the transform skip to the joint chrominance encoding mode. Therefore, encoding complexity may have increased, and an encoding load may have increased.

The present disclosure has been made in view of the foregoing, and is intended to enable suppression of an increase in encoding load.

Solutions to Problems

An image processing device according to one aspect of the present technology is an image processing device that includes an encoding mode setting unit configured to set an encoding mode of encoding of an image by setting a transform type with a minimum encoding cost in a non-joint chrominance encoding mode as a transform type in a joint chrominance encoding mode, and deriving an encoding cost in the joint chrominance encoding mode.

An image processing method according to one aspect of the present technology is an image processing method that includes setting an encoding mode of encoding of an image by setting a transform type with a minimum encoding cost in a non-joint chrominance encoding mode as a transform type in a joint chrominance encoding mode, and deriving an encoding cost in the joint chrominance encoding mode.

In the image processing device and image processing method according to one aspect of the present technology, an encoding mode of encoding of an image is set by setting a transform type with a minimum encoding cost in a non-joint chrominance encoding mode as a transform type in a joint chrominance encoding mode, and deriving an encoding cost in the joint chrominance encoding mode.

BRIEF DESCRIPTION OF DRAWINGS

FIG. 1 is a diagram for describing setting of a transform skip flag.

FIG. 2 is a diagram illustrating an example of setting a transform skip flag for deriving an encoding cost.

MODE FOR CARRYING OUT THE INVENTION

Figure 3:
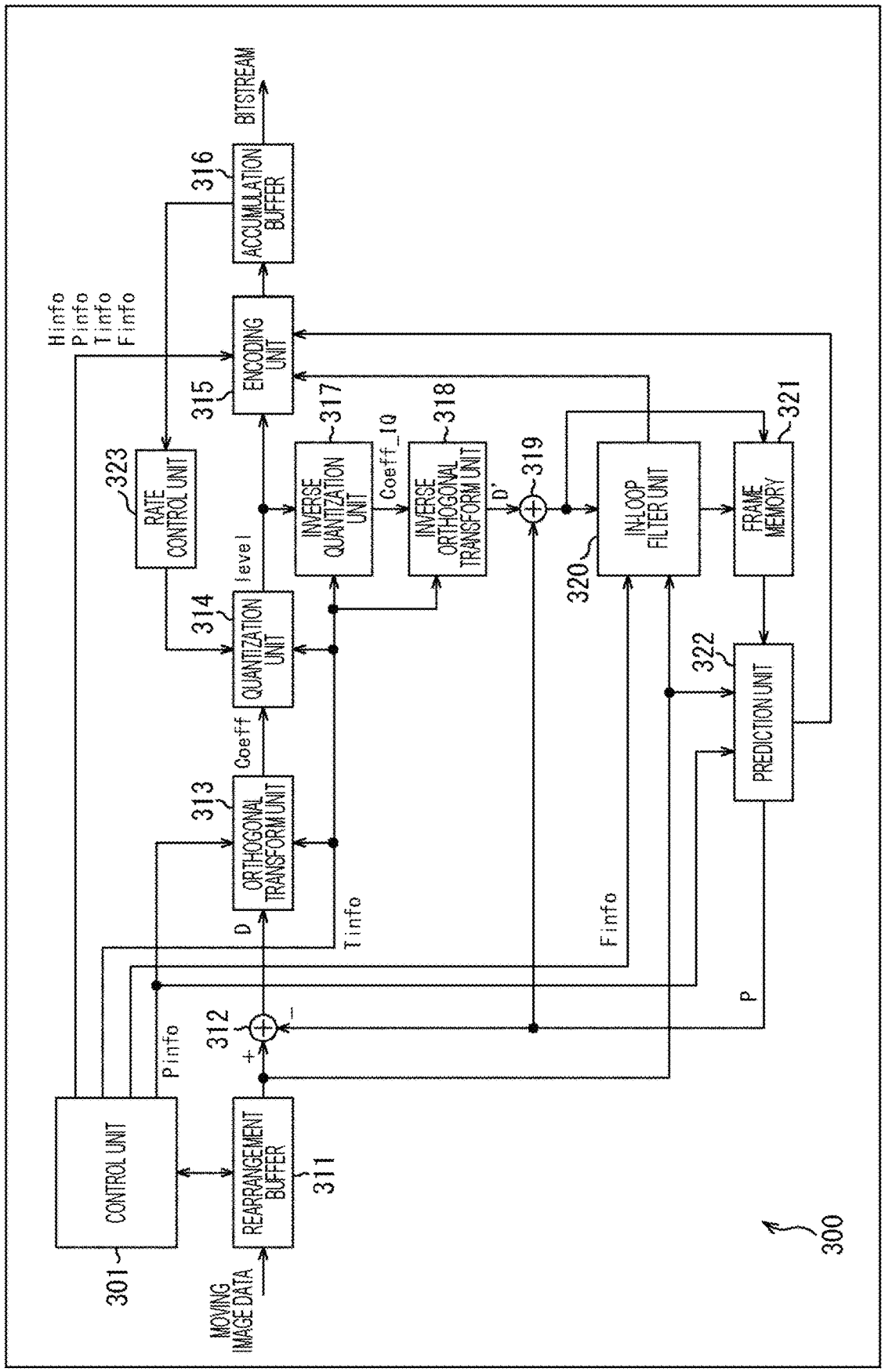
FIG. 3 is a block diagram illustrating a main configuration example of an image encoding device.

Hereinafter, modes for implementing the present disclosure (hereinafter referred to as embodiments) will be described. Note that description will be given in the following order.

1. Setting of encoding mode
2. First embodiment (image encoding device)
3. Second embodiment (image decoding device)
4. Supplement

1. Setting of Encoding Mode

Documents that Support Technical Content and Technical Terms and the Like

The scope disclosed in the present technology includes not only the content described in the embodiments but also the content described in the following non-patent documents and the like and the content of other documents referred to in the following non-patent documents that are known at the time of filing the application.

Non-Patent Document 1: (described above)
Non-Patent Document 2: (described above)
Non-Patent Document 3: Recommendation ITU-T H.264 (April 2017) "Advanced video coding for generic audio-visual services", April 2017
Non-Patent Document 4: Recommendation ITU-T H.265 (February 2018) "High efficiency video coding", February 2018

That is, the content described in Non-Patent Documents above can serves as a basis for determining the support requirements. For example, the quad-tree block structure and the quad tree plus binary tree (QTBT) block structure described in Non-Patent Documents above fall within the disclosure range of the present technology even if these pieces of content are not directly described in the examples, and satisfy the support requirements of the claims. Furthermore, for example, technical terms such as parsing, syntax, and semantics similarly fall within the disclosure range of the present technology even in the case where these technical terms are not directly described in the examples, and satisfy the support requirements of claims.

Furthermore, in the present specification, a "block" (not a block indicating a processing unit) used for description as a partial region or a unit of processing of an image (picture) indicates an arbitrary partial region in a picture unless otherwise specified, and the size, shape, characteristics, and the like of the block are not limited. For example, the "block" includes an arbitrary partial region (unit of processing) such as a transform block (TB), a transform unit (TU), a prediction block (PB), a prediction unit (PU), a smallest coding unit (SCU), a coding unit (CU), a largest coding unit (LCU), a coding tree block (CTB), a coding tree unit (CTU), a subblock, a macro block, a tile, or a slice, described in Non-Patent Documents above.

Furthermore, in specifying the size of such a block, not only the block size is directly specified but also the block size may be indirectly specified. For example, the block size may be specified using identification information for identifying the size. Furthermore, for example, the block size may be specified by a ratio or a difference from the size of a reference block (for example, an LCU, an SCU, or the like). For example, in a case of transmitting information for specifying the block size as a syntax element or the like, information for indirectly specifying the size as described above may be used as the information. With the configuration, the amount of information can be reduced, and the encoding efficiency can be improved in some cases. Furthermore, the specification of the block size also includes specification of a range of the block size (for example, specification of a range of an allowable block sizes, or the like).

Furthermore, in the present specification, encoding includes not only the whole processing of transforming an image into a bitstream but also part of the processing. For example, encoding includes not only processing that includes prediction processing, orthogonal transform, quantization, arithmetic encoding, and the like but also processing that collectively refers to quantization and arithmetic encoding, processing including prediction processing, quantization, and arithmetic encoding, and the like. Similarly, decoding includes not only the whole processing of transforming a bitstream into an image but also part of the processing. For example, decoding includes not only processing including inverse arithmetic decoding, inverse quantization, inverse orthogonal transform, prediction processing, and the like but also processing including inverse arithmetic decoding and inverse quantization, processing including inverse arithmetic decoding, inverse quantization, and prediction processing, and the like.

<Joint Chrominance Encoding Mode and Transform Skip>

In versatile video coding (VVC) described in Non-Patent Document 1 or Non-Patent Document 2, a transform skip flag (transform_skip_flag), which is flag information indicating whether or not to apply transform skip, which is a mode for skipping (omitting) orthogonal transform, is defined. A of FIG. 1 illustrates an example of syntax of a transform skip flag related to a chrominance component Cb. B of FIG. 1 illustrates an example of syntax of a transform skip flag related to a chrominance component Cr.

Furthermore, in the VVC described in Non-Patent Document 1 or Non-Patent Document 2, a joint chrominance encoding mode (joint CbCr mode), which is a mode for encoding residual samples of both the Cb and Cr as single transform blocks, is prepared. In other words, the joint chrominance encoding mode is a mode for encoding an orthogonal transform coefficient from which residuals of both the Cb and Cr can be derived. In the joint chrominance encoding mode, for example, a coefficient of Cb is encoded. Then, at the time of decoding, a coefficient of Cr is derived using the decoded coefficient of Cb. By doing so, improvement in encoding efficiency can be expected.

<Increase in Load in Setting of Encoding Mode>

By the way, in the implementation of the VVC VTM software described in Non-Patent Document 2, the transform type applied to chrominance is limited in the joint chrominance encoding mode. An example thereof is illustrated in C of FIG. 1. tu_joint_cbcr_residual_flag is flag information indicating whether or not the joint chrominance encoding mode is applied. The case of tu_joint_cbcr_residual_flag=1 indicates that the joint chrominance encoding mode is applied. The case of tu_joint_cbcr_residual_flag=0 indicates that the joint chrominance encoding mode is not applied (also referred to as a non-joint chrominance encoding mode).

As illustrated in C of FIG. 1, in the case of the non-joint chrominance encoding mode, applicable transform types are discrete cosine transform 2 (DCT2) and transform skip (TS). In contrast, in the case of the joint chrominance encoding mode, the applicable transform type is only DCT2. When the application of the transform skip is limited in this manner, signaling of the transform skip flag in the joint chrominance encoding mode is unnecessary. That is, due to the signaling of the transform skip flag in the joint chrominance encoding mode, a code amount may have been unnecessarily increased, and encoding efficiency may have been reduced.

In contrast, in the versatile video coding (VVC) working draft described in Non-Patent Document 1, chrominance transform skip can be applied regardless of a joint chrominance encoding mode (joint CbCr mode). An example thereof is illustrated in D of FIG. 1. As illustrated in D of FIG. 1, in this case, DCT2 and transform skip can be applied regardless of the joint chrominance encoding mode. Therefore, as compared with the method described in Non-Patent Document 2, a reduction in encoding efficiency due to redundancy of the transform skip flag can be suppressed.

However, in the VVC described in Non-Patent Document 1 or Non-Patent Document 2, a plurality of encoding modes is prepared, and an encoding mode with the lowest encoding cost is selected and applied from the encoding modes. That is, in the case of the method described in Non-Patent Document 1, it has been necessary to evaluate the encoding costs of both the case of applying the transform skip and the case of not applying the transform skip for each of the joint chrominance encoding mode and the non-joint chrominance encoding mode at the time of encoding. Therefore, the encoding complexity may have increased, and the encoding load may have increased.

<Diversion of Transform Type Setting>

Therefore, when the encoding mode is set, the transform type with the minimum encoding cost in the non-joint chrominance encoding mode is set as the transform type in the joint chrominance encoding mode, and the encoding cost in the joint chrominance encoding mode is obtained. Here, the transform type may be either DCT2 or transform skip as described above. In this case, a value of the chrominance transform skip flag with the minimum encoding cost in the non-joint chrominance encoding mode is only required to be set as the chrominance transform skip flag in the joint chrominance encoding mode. An example of the syntax is illustrated in FIG. 2. In FIG. 2, "bestTsFlag [codedCIdx] in non-JointCbCr mode" indicates the chrominance transform skip flag with the minimum encoding cost in the non-joint chrominance encoding mode. Furthermore, "transform_skip_flag[codedCIdx] in JointCbCr mode" indicates the chrominance transform skip flag in the joint chrominance encoding mode.

For example, in an image processing method, the encoding mode of image encoding is set by setting the transform type with the minimum encoding cost in the non-joint chrominance encoding mode as the transform type in the joint chrominance encoding mode, and deriving the encoding cost in the joint chrominance encoding mode.

For example, an image processing device includes an encoding mode setting unit that sets an encoding mode of image encoding by setting the transform type in the chrominance encoding mode and deriving the encoding cost in the joint chrominance encoding mode.

By doing so, in a joint chrominance mode, the transform type of the joint chrominance encoding mode can be set without searching for both modes of DCT2 and transform skip. Therefore, as compared with the case of deriving the encoding costs of both the case of applying the transform skip and the case of not applying the transform skip for each of the joint chrominance encoding mode and the non-joint chrominance encoding mode, an increase in encoding complexity can be suppressed and an increase in encoding load can be suppressed. Therefore, for example, the transform type can be set at high speed. Furthermore, an increase in cost of an encoder can be suppressed.

In addition, reduction in encoding efficiency can be suppressed as compared with the case of limiting the application of the transform skip in the joint chrominance encoding mode as described in Non-Patent Document 2.

2. First Embodiment

<Image Encoding Device>

FIG. 3 is a block diagram illustrating an example of a configuration of an image encoding device that is one mode of an image processing device to which the present technology is applied. An image encoding device 300 illustrated in FIG. 3 is a device that encodes image data of a moving image. For example, the image encoding device 300 can encode image data of a moving image by the encoding method described in any one of Non-Patent Documents.

Note that FIG. 3 illustrates main processing units (blocks), data flows, and the like, and those illustrated in FIG. 3 are not necessarily everything. That is, in the image encoding device 300, there may be a processing unit not illustrated as a block in FIG. 3, or processing or data flow not illustrated as an arrow or the like in FIG. 3.

As illustrated in FIG. 3, the image encoding device 300 includes a control unit 301, a rearrangement buffer 311, a calculation unit 312, an orthogonal transform unit 313, a quantization unit 314, an encoding unit 315, an accumulation buffer 316, an inverse quantization unit 317, an inverse orthogonal transform unit 318, a calculation unit 319, an in-loop filter unit 320, a frame memory 321, a prediction unit 322, and a rate control unit 323.

<Control Unit>

The control unit 301 divides moving image data held by the rearrangement buffer 311 into blocks (CUs, PUs, transform blocks, or the like) in units of processing on the basis of a block size in external or pre-designated units of processing. Furthermore, the control unit 301 determines encoding parameters (header information Hinfo, prediction mode information Pinfo, transform information Tinfo, filter information Finfo, and the like) to be supplied to each block on the basis of, for example, rate-distortion optimization (RDO).

Details of these encoding parameters will be described below. After determining the above-described encoding parameters, the control unit 301 supplies the encoding parameters to each block. For example, the header information Hinfo is supplied to each block. The prediction mode information Pinfo is supplied to the encoding unit 315 and the prediction unit 322. The transform information Tinfo is supplied to the encoding unit 315, the orthogonal transform unit 313, the quantization unit 314, the inverse quantization unit 317, and the inverse orthogonal transform unit 318. The filter information Finfo is supplied to the in-loop filter unit 320.

<Rearrangement Buffer>

Each field (input image) of moving image data is input to the image encoding device 300 in reproduction order (display order). The rearrangement buffer 311 acquires and holds (stores) each input image in its reproduction order (display order). The rearrangement buffer 311 rearranges the input images in encoding order (decoding order) or divides the input images into blocks in units of processing on the basis of the control of the control unit 301. The rearrangement buffer 311 supplies the processed input image to the calculation unit 312. Furthermore, the rearrangement buffer 311 also supplies the input images (original images) to the prediction unit 322 and the in-loop filter unit 320.

<Calculation Unit>

The calculation unit 312 receives an image I corresponding to the block in units of processing and a predicted image P supplied from the prediction unit 322 as inputs, subtracts the predicted image P from the image I as illustrated in the following expression to derive a prediction residual D, and supplies the prediction residual D to the orthogonal transform unit 313.

$D=I-P$

<Orthogonal Transform Unit>

The orthogonal transform unit 313 executes processing regarding coefficient transform. For example, the orthogonal transform unit 313 acquires the prediction residual D supplied from the calculation unit 312. Furthermore, the orthogonal transform unit 313 acquires the transform information Tinfo supplied from the control unit 301.

The orthogonal transform unit 313 performs orthogonal transform for the prediction residual D on the basis of the transform information Tinfo to derive a transform coefficient Coeff. For example, the orthogonal transform unit 313 performs primary transform for the prediction residual D to generate a primary transform coefficient. Then, the orthogonal transform unit 313 performs secondary transform for the primary transform coefficient to generate a secondary transform coefficient. The orthogonal transform unit 313 supplies the obtained secondary transform coefficient to the quantization unit 314 as the transform coefficient Coeff.

Note that the orthogonal transform is an example of coefficient transform, and is not limited to this example. That is, the orthogonal transform unit 313 can executes arbitrary coefficient transform for the prediction residual D. In addition, the orthogonal transform unit 313 can execute arbitrary coefficient transform as primary transform and secondary transform.

<Quantization Unit>

The quantization unit 314 executes processing regarding quantization. For example, the quantization unit 314 acquires the transform coefficient Coeff supplied from the orthogonal transform unit 313. Furthermore, the quantization unit 314 acquires the transform information Tinfo supplied from the control unit 301. Moreover, the quantization unit 314 scales (quantizes) the transform coefficient Coeff on the basis of the transform information Tinfo. Note that this quantization method is arbitrary. Furthermore, a rate of this quantization is controlled by the rate control unit 323. The quantization unit 314 supplies a quantized transform coefficient obtained by the quantization, that is, a quantized transform coefficient level level to the encoding unit 315 and the inverse quantization unit 317.

<Encoding Unit>

The encoding unit 315 executes processing regarding encoding. For example, the encoding unit 315 acquires the quantized transform coefficient level level supplied from the quantization unit 314. Furthermore, the encoding unit 315 acquires various encoding parameters (header information Hinfo, prediction mode information Pinfo, transform information Tinfo, filter information Finfo, and the like) supplied from the control unit 301. Moreover, the encoding unit 315 acquires information regarding a filter such as a filter coefficient supplied from the in-loop filter unit 320. Furthermore, the encoding unit 315 acquires information regarding an optimum prediction mode supplied from the prediction unit 322.

The encoding unit 315 performs variable-length coding (for example, arithmetic encoding) for the quantized transform coefficient level level to generate a bit string (coded data). Furthermore, the encoding unit 315 derives residual information Rinfo from the quantized transform coefficient level level. Then, the encoding unit 315 encodes the derived residual information Rinfo to generate a bit string.

The encoding unit 315 includes the information regarding a filter supplied from the in-loop filter unit 320 in the filter information Finfo. Furthermore, the encoding unit 315 includes the information regarding an optimum prediction mode supplied from the prediction unit 322 in the prediction mode information Pinfo. Then, the encoding unit 315 encodes the above-described various encoding parameters (header information Hinfo, prediction mode information Pinfo, transform information Tinfo, filter information Finfo, and the like) to generate a bit string.

The encoding unit 315 multiplexes the bit string of the various types of information generated as described above to generate coded data. The encoding unit 315 supplies the coded data to the accumulation buffer 316.

<Accumulation Buffer>

The accumulation buffer 316 temporarily stores the coded data obtained by the encoding unit 315. The accumulation buffer 316 outputs the stored coded data to an outside of the image encoding device 300 as a bitstream or the like at predetermined timing. For example, the coded data is transmitted to a decoding side via an arbitrary recording medium, an arbitrary transmission medium, an arbitrary information processing device, or the like. That is, the accumulation buffer 316 is also a transmission unit that transmits coded data (bitstream).

<Inverse Quantization Unit>

The inverse quantization unit 317 executes processing regarding inverse quantization. For example, the inverse quantization unit 317 acquires the quantized transform coefficient level level supplied from the quantization unit 314. Furthermore, the inverse quantization unit 317 acquires the transform information Tinfo supplied from the control unit 301.

The inverse quantization unit 317 scales (inversely quantizes) a value of the quantized transform coefficient level level on the basis of the transform information Tinfo. Note that this inverse quantization is inverse processing of the quantization executed in the quantization unit 314. The inverse quantization unit 317 supplies a transform coefficient Coeff_IQ obtained by the inverse quantization to the inverse orthogonal transform unit 318.

<Inverse Orthogonal Transform Unit>

The inverse orthogonal transform unit 318 executes processing regarding inverse coefficient transform. For example, the inverse orthogonal transform unit 318 acquires the transform coefficient Coeff_IQ supplied from the inverse quantization unit 317. Furthermore, the inverse orthogonal transform unit 318 acquires the transform information Tinfo supplied from the control unit 301.

The inverse orthogonal transform unit 318 executes inverse orthogonal transform for the transform coefficient Coeff_IQ on the basis of the transform information Tinfo to derive a prediction residual D'. Note that the inverse orthogonal transform is inverse processing of the orthogonal transform executed in the orthogonal transform unit 313. For example, the inverse orthogonal transform unit 318 performs inverse secondary transform for the transform coefficient Coeff_IQ (secondary transform coefficient) to generate a primary transform coefficient. Furthermore, the inverse orthogonal transform unit 318 performs inverse primary transform for the primary transform coefficient to generate the prediction residual D'. Note that the inverse secondary transform is inverse processing of the secondary transform executed in the orthogonal transform unit 313. Furthermore, the inverse primary transform is inverse processing of primary transform executed in the orthogonal transform unit 313.

The inverse orthogonal transform unit 318 supplies the prediction residual D' obtained by the inverse orthogonal transform to the calculation unit 319. Note that, since the inverse orthogonal transform unit 318 is similar to an inverse orthogonal transform unit on the decoding side (to be described below), description to be given (to be described below) for the decoding side can be applied to the inverse orthogonal transform unit 318.

<Calculation Unit>

The calculation unit 319 uses the prediction residual D' supplied from the inverse orthogonal transform unit 318 and the predicted image P supplied from the prediction unit 322 as inputs. The calculation unit 319 adds the prediction residual D' and the predicted image P corresponding to the prediction residual D' to derive a locally decoded image Rlocal. The calculation unit 319 supplies the derived locally decoded image Rlocal to the in-loop filter unit 320 and the frame memory 321.

<In-Loop Filter Unit>

The in-loop filter unit 320 executes processing regarding in-loop filtering processing. For example, the in-loop filter unit 320 uses the locally decoded image Rlocal supplied from the calculation unit 319, the filter information Finfo supplied from the control unit 301, and the input image (original image) supplied from the rearrangement buffer 311 as inputs. Note that the information input to the in-loop filter unit 320 is arbitrary, and information other than the aforementioned information may be input. For example, information such as the prediction mode, motion information, a code amount target value, a quantization parameter QP, a picture type, and a block (a CU, a CTU, or the like), and the like may be input to the in-loop filter unit 320, as necessary.

The in-loop filter unit 320 appropriately executes filtering processing for the locally decoded image Rlocal on the basis of the filter information Finfo. The in-loop filter unit 320 also uses the input image (original image) and other input information for the filtering processing as necessary.

For example, the in-loop filter unit 320 can apply a bilateral filter as the filtering processing. Furthermore, the in-loop filter unit 320 can apply a deblocking filter (DBF) as the filtering processing. Moreover, the in-loop filter unit 320 can apply an adaptive offset filter (sample adaptive offset (SAO)) as the filtering processing. Furthermore, the in-loop filter unit 320 can apply an adaptive loop filter (ALF) as the filtering processing. Moreover, the in-loop filter unit 320 can apply a plurality of filters among the above filters in combination as the filtering processing. Note that which filter is applied and in which order the filters are applied are arbitrary and can be selected as appropriate. For example, the in-loop filter unit 320 applies the four in-loop filters of the bilateral filter, the deblocking filter, the adaptive offset filter, and the adaptive loop filter in this order as the filtering processing.

Of course, the filtering processing executed by the in-loop filter unit 320 is arbitrary and is not limited to the above example. For example, the in-loop filter unit 320 may apply a Wiener filter or the like.

The in-loop filter unit 320 supplies the filtered locally decoded image Rlocal to the frame memory 321. Note that, in a case of transmitting the information regarding filters such as filter coefficients to the decoding side, the in-loop filter unit 320 supplies the information regarding filters to the encoding unit 315.

<Frame Memory>

The frame memory 321 executes processing regarding storage of data related to an image. For example, the frame memory 321 uses the locally decoded image Rlocal supplied from the calculation unit 319 and the filtered locally decoded image Rlocal supplied from the in-loop filter unit 320 as inputs, and holds (stores) the inputs. Furthermore, the frame memory 321 reconstructs and holds a decoded image R for each picture unit, using the locally decoded image Rlocal (stores the decoded image R in a buffer in the frame memory 321). The frame memory 321 supplies the decoded image R (or a part thereof) to the prediction unit 322 in response to a request from the prediction unit 322.

<Prediction Unit>

The prediction unit 322 executes processing regarding generation of a predicted image. For example, the prediction unit 322 acquires the prediction mode information Pinfo supplied from the control unit 301. Furthermore, the prediction unit 322 acquires the input image (original image) supplied from the rearrangement buffer 311. Further, the prediction unit 322 acquires the decoded image R (or a part thereof) read from frame memory 321.

The prediction unit 322 executes prediction processing such as inter prediction or intra prediction using the prediction mode information Pinfo and the input image (original image). That is, the prediction unit 322 generates the predicted image P by executing prediction and motion compensation with reference to the decoded image R as a reference image.

The prediction unit 322 supplies the generated predicted image P to the calculation units 312 and 319. Furthermore, the prediction unit 322 supplies a prediction mode selected by the above processing, that is, the information regarding an optimal prediction mode to the encoding unit 315, as necessary.

<Rate Control Unit>

The rate control unit 323 executes processing regarding rate control. For example, the rate control unit 323 controls a rate of a quantization operation of the quantization unit 314 so that an overflow or an underflow does not occur on the basis of the code amount of the coded data accumulated in the accumulation buffer 316.

<Control of Encoding Mode>

The present technology described in <1. Setting of encoding mode> is applied to the image encoding device 300 having the above configuration. That is, as described above in <Diversion of transform type setting>, it is assumed that the chrominance transform skip can be applied regardless of the joint chrominance encoding mode when the encoding mode is set. Then, the transform type with the minimum encoding cost in the non-joint chrominance encoding mode is set as the transform type in the joint chrominance encoding mode, and the encoding cost in the joint chrominance encoding mode is derived.

For example, the control unit 301 acts as an encoding mode setting unit that sets the encoding mode of image encoding. Then, in the setting of the encoding mode, the control unit 301 can apply the chrominance transform skip regardless of the joint chrominance encoding mode. Moreover, the control unit 301 sets the encoding mode of image encoding by setting the transform type with the minimum encoding cost in the non-joint chrominance encoding mode as the transform type in the joint chrominance encoding mode, and deriving the encoding cost in the joint chrominance encoding mode.

By doing so, in the joint chrominance mode, the control unit 301 can set the transform type of the joint chrominance encoding mode without searching for both the modes of DCT2 and transform skip. Therefore, the image encoding device 300 can suppress an increase in encoding complexity and can suppress an increase in encoding load as compared with the case of not limiting the application of the chrominance transform skip in the joint chrominance encoding mode as described in Non-Patent Document 1. Therefore, for example, the image encoding device 300 can set the transform type at a high speed. Furthermore, an increase in cost of the image encoding device 300 can be suppressed.

In addition, the image encoding device 300 can suppress reduction in encoding efficiency as compared with the case of limiting the application of the transform skip in the joint chrominance encoding mode as described in Non-Patent Document 2.

Note that, in the example illustrated in D of FIG. 1, setting regarding the joint chrominance encoding mode and setting of the transform type are executed as the setting of the encoding mode. Similarly to this example, the control unit 301 may execute the setting regarding the joint chrominance encoding mode and the setting of the transform type as the setting of the encoding mode.

For example, the control unit 301 may set whether or not to apply the joint chrominance encoding mode (that is, whether or not to apply the joint chrominance encoding mode or whether or not to apply the non-joint chrominance encoding mode). Furthermore, in the case of applying the joint chrominance encoding mode, the control unit 301 may further set which one (content of the joint chrominance encoding) of a plurality of candidate modes is applied. For example, a plurality of modes such as a mode for applying the same coefficient as Cb to Cr, a mode for applying a coefficient with an inverted sign of the coefficient of Cb to Cr, and a mode for applying a value obtained by multiplying the coefficient of Cb by ½ to Cr can be provided as candidates for the joint chrominance encoding mode. Moreover, the control unit 301 may set what the transform type is to be.

Furthermore, in the example illustrated in D of FIG. 1, the transform skip can also be applied in the joint chrominance encoding mode. Similarly to this example, the control unit 301 may set whether or not to apply the transform skip as the transform type in the joint chrominance encoding mode. That is, in the case of applying the joint chrominance encoding mode, the control unit 301 may set the value of the transform skip flag, which is the flag information indicating whether or not to apply the transform skip.

In this case, as illustrated in FIG. 2, the control unit 301 may set the value (bestTsFlag) of the transform skip flag with the minimum encoding cost in the non-joint chrominance encoding mode to the transform skip flag (transform_skip_flag) in the joint chrominance encoding mode.

Furthermore, in the case of the example illustrated in D of FIG. 1, in a case where the joint chrominance encoding mode is applied and the transform skip is not applied (in the case of non-transform skip), DCT2 is applied as the transform type. Similarly to this example, the control unit 301 may apply DCT2 as the transform type in the case of not applying the transform skip in the joint chrominance encoding mode.

The information regarding the encoding mode set by the control unit 301 as described above is supplied to the orthogonal transform unit 313 and the encoding unit 315, for example, as Tinfo or the like. For example, the control unit 301 supplies, to the orthogonal transform unit 313 and the encoding unit 315, information such as tu_joint_residual_flag that is the flag information indicating whether or not to apply the joint chrominance encoding mode, TuCResMode that is a parameter indicating the content of the joint chrominance encoding mode, the transform skip flag (transform_skip_flag (also referred to as tsFlag)), and the like, as Tinfo.

The orthogonal transform unit 313 orthogonally transforms the prediction residual D derived by the calculation unit 312 on the basis of the information (that is, according to the set encoding mode). The quantization unit 314 quantizes the transform coefficient Coeff derived by the orthogonal transform unit 313. Furthermore, the encoding unit 315 encodes the quantized transform coefficient level level derived by the quantization unit 314 on the basis of the information (that is, according to the set encoding mode) to generate coded data. Moreover, the encoding unit 315 encodes the information (for example, the transform skip flag and the like) and includes the encoded information in the coded data of the quantized transform coefficient level level.

Configuration Example

Note that these processing units (the processing units such as the control unit 301 illustrated in FIG. 3) have an arbitrary configuration. For example, each processing unit may be configured by a logic circuit that implements the above-described processing. Furthermore, each processing unit may include, for example, a CPU, a ROM, a RAM, and the like, and implement the above-described processing by executing a program using the above resources. Of course, each processing unit may have both the configurations and implement part of the above-described processing by the logic circuit and implement the other of the processing by executing the program. The configurations of the processing units may be independent of each other. For example, some of the processing units may implement part of the above-described processing by the logic circuit, some of the processing units may implement the above-described processing by executing the program, and some of the processing units may implement the above-described processing by both the logic circuit and execution of the program.

<Flow of Image Encoding Processing>

Next, an example of a flow of image encoding processing executed by the image encoding device 300 having the above configuration will be described with reference to a flowchart of FIG. 4.

When the image encoding processing is started, in step S301, the rearrangement buffer 311 is controlled by the control unit 301 and rearranges frames of input moving image data from the display order to the encoding order.

In step S302, the control unit 301 sets the unit of processing (performs block division) for an input image held by the rearrangement buffer 311.

In step S303, the control unit 301 determines (sets) an encoding parameter for the input image held by the rearrangement buffer 311.

In step S304, the prediction unit 322 executes the prediction processing and generates the predicted image or the like in the optimum prediction mode. For example, in this prediction processing, the prediction unit 322 executes the intra prediction to generate the predicted image or the like in an optimum intra prediction mode. Furthermore, the prediction unit 322 executes the inter prediction to generate the predicted image or the like in an optimum inter prediction mode. Moreover, the prediction unit 322 selects an optimum prediction mode from among the above modes on the basis of a cost function value and the like.

In step S305, the calculation unit 312 calculates a difference between the input image and the predicted image in the optimal mode selected by the prediction processing in step S304. That is, the calculation unit 312 generates the prediction residual D between the input image and the predicted image. The prediction residual D obtained in this way is reduced in the data amount as compared with the original image data. Therefore, the data amount can be compressed as compared with a case of encoding the image as it is.

In step S306, the orthogonal transform unit 313 executes the orthogonal transform processing for the prediction residual D generated by the processing in step S305 to derive the transform coefficient Coeff. For example, the orthogonal transform unit 313 executes the primary transform for the prediction residual D to generate the primary transform coefficient. Furthermore, the orthogonal transform unit 313 executes the secondary transform for the primary transform coefficient to generate the secondary transform coefficient (transform coefficient Coeff).

In step S307, the quantization unit 314 quantizes the transform coefficient Coeff obtained by the processing in step S306 by using a quantization parameter calculated by the control unit 301 or the like to derive the quantized transform coefficient level level.

In step S308, the inverse quantization unit 317 inversely quantizes the quantized transform coefficient level level generated by the processing in step S307 with characteristics corresponding to the characteristics of the quantization in step S307 to derive the transform coefficient Coeff_IQ.

In step S309, the inverse orthogonal transform unit 318 inversely orthogonally transforms the transform coefficient Coeff_IQ obtained by the processing in step S308 by a method corresponding to the orthogonal transform processing in step S306 to derive the prediction residual D'. For example, the inverse orthogonal transform unit 318 executes the inverse secondary transform for the transform coefficient Coeff_IQ (secondary transform coefficient) to generate the primary transform coefficient. Furthermore, the inverse orthogonal transform unit 318 executes the inverse primary transform for the primary transform coefficient to generate the prediction residual D'.

Note that this inverse orthogonal transform processing is similar to the inverse orthogonal transform processing executed on the decoding side. Therefore, the description of the decoding side to be described below can be applied to the inverse orthogonal transform processing of step S309.

In step S310, the calculation unit 319 adds the predicted image obtained by the prediction processing in step S304 to the prediction residual D' derived by the processing in step S309 to generate a locally decoded image.

In step S311, the in-loop filter unit 320 executes the in-loop filtering processing for the locally decoded image derived by the processing in step S310.

In step S312, the frame memory 321 stores the locally decoded image derived by the processing in step S310 and the locally decoded image filtered in step S311.

In step S313, the encoding unit 315 encodes the quantized transform coefficient level level obtained by the processing in step S307. For example, the encoding unit 315 encodes the quantized transform coefficient level level that is information regarding the image by arithmetic encoding or the like to generate the coded data. Furthermore, at this time, the encoding unit 315 encodes the various encoding parameters (header information Hinfo, prediction mode information Pinfo, and transform information Tinfo). Moreover, the encoding unit 315 derives the residual information RInfo from the quantized transform coefficient level level and encodes the residual information RInfo.

In step S314, the accumulation buffer 316 accumulates the coded data thus obtained, and outputs the coded data to the outside of the image encoding device 300, for example, as a bitstream. The bitstream is transmitted to the decoding side via a transmission path or a recording medium, for example. Furthermore, the rate control unit 323 executes rate control as necessary.

When the processing in step S314 ends, the image encoding processing ends.

<Control of Encoding Mode>

The present technology described in <1. Setting of encoding mode> is applied to the image encoding processing of the above flow. That is, as described above in <Diversion of transform type setting>, it is assumed that the chrominance transform skip can be applied regardless of the joint chrominance encoding mode when the encoding mode is set. Then, the transform type with the minimum encoding cost in the non-joint chrominance encoding mode is set as the transform type in the joint chrominance encoding mode, and the encoding cost in the joint chrominance encoding mode is derived.

For example, in step S303, the control unit 301 executes the encoding mode setting processing and sets the encoding mode for encoding an image. In the setting of the encoding mode, the chrominance transform skip can be applied regardless of the joint chrominance encoding mode. Moreover, the control unit 301 sets the encoding mode by setting the transform type with the minimum encoding cost in the non-joint chrominance encoding mode as the transform type in the joint chrominance encoding mode, and deriving the encoding cost in the joint chrominance encoding mode.

In step S306, the orthogonal transform unit 313 orthogonally transforms the prediction residual D according to the set encoding mode. Furthermore, in step S313, the encoding unit 315 encodes the quantized transform coefficient level level according to the set encoding mode to generate the coded data. Moreover, the encoding unit 315 encodes the information (for example, the transform skip flag and the like) related to the encoding mode and includes the encoded information in the coded data of the quantized transform coefficient level level.

By doing so, in the joint chrominance mode, the control unit 301 can set the transform type of the joint chrominance encoding mode without searching for both the modes of DCT2 and transform skip. Therefore, the image encoding device 300 can suppress an increase in encoding complexity and can suppress an increase in encoding load as compared with the case of not limiting the application of the chrominance transform skip in the joint chrominance encoding mode as described in Non-Patent Document 1. Therefore, for example, the image encoding device 300 can set the transform type at a high speed. Furthermore, an increase in cost of the image encoding device 300 can be suppressed.

In addition, the image encoding device 300 can suppress reduction in encoding efficiency as compared with the case of limiting the application of the transform skip in the joint chrominance encoding mode as described in Non-Patent Document 2.

<Flow of Encoding Mode Setting Processing>

An example of a flow of the encoding mode setting processing executed in step S303 of FIG. 4 will be described with reference to the flowcharts of FIGS. 5 and 6.

When the encoding mode setting processing is started, the control unit 301 sets the non-joint chrominance encoding mode in step S351. For example, the control unit 301 sets tu_joint_cbcr_residual_flag to false (for example, "0") and sets TuCResMode[xTbY][yTbY] to "0".

In step S352, the control unit 301 derives the encoding cost of each transform type for the non-joint chrominance encoding mode. For example, in the non-joint chrominance encoding mode, the control unit 301 derives the encoding costs for the case where the transform type is DCT2 and the case where the transform type is the transform skip (TS).

The control unit 301 executes this processing for each of the chrominance components Cb and Cr.

In step S353, the control unit 301 sets the transform type with the minimum encoding cost among the encoding costs derived in the processing of step S352. For example, the control unit 301 sets the value of the transform skip flag corresponding to the transform type with the minimum encoding cost derived in the processing of step S352 to bestFlag[cIdx]. The control unit 301 executes this processing for each of the chrominance components Cb and Cr.

In step S354, the control unit 301 sets the joint chrominance encoding mode on the basis of chrominance cbf (coded block flag) in the non-joint chrominance encoding mode. The chrominance cbf is flag information indicating whether or not to encode the transform coefficient of the block. In other words, the chrominance cbf is flag information indicating whether or not the block includes a transform coefficient that is not 0.

For example, the control unit 301 sets tu_joint_cbcr_residual_flag to true (for example, "1"). Then, the control unit 301 sets TuCResMode[xTbY][yTbY] on the basis of tu_cbf_cb that is cbf of a TU to be processed of the chrominance component Cb and tu_cbf_cr that is cbf of a TU to be processed of the chrominance component Cr.

For example, in a case of tu_cbf_cb==1 and tu_cbf_cr==0, the control unit 301 sets TuCResMode[xTbY][yTbY] to "1". Furthermore, in a case of tu_cbf_cb==1 and tu_cbf_cr==1, the control unit 301 sets TuCResMode[xTbY][yTbY] to "2". Moreover, in a case of tu_cbf_cb==0 and tu_cbf_cr==1, the control unit 301 sets TuCResMode[xTbY][yTbY] to "3".

Figure 6:
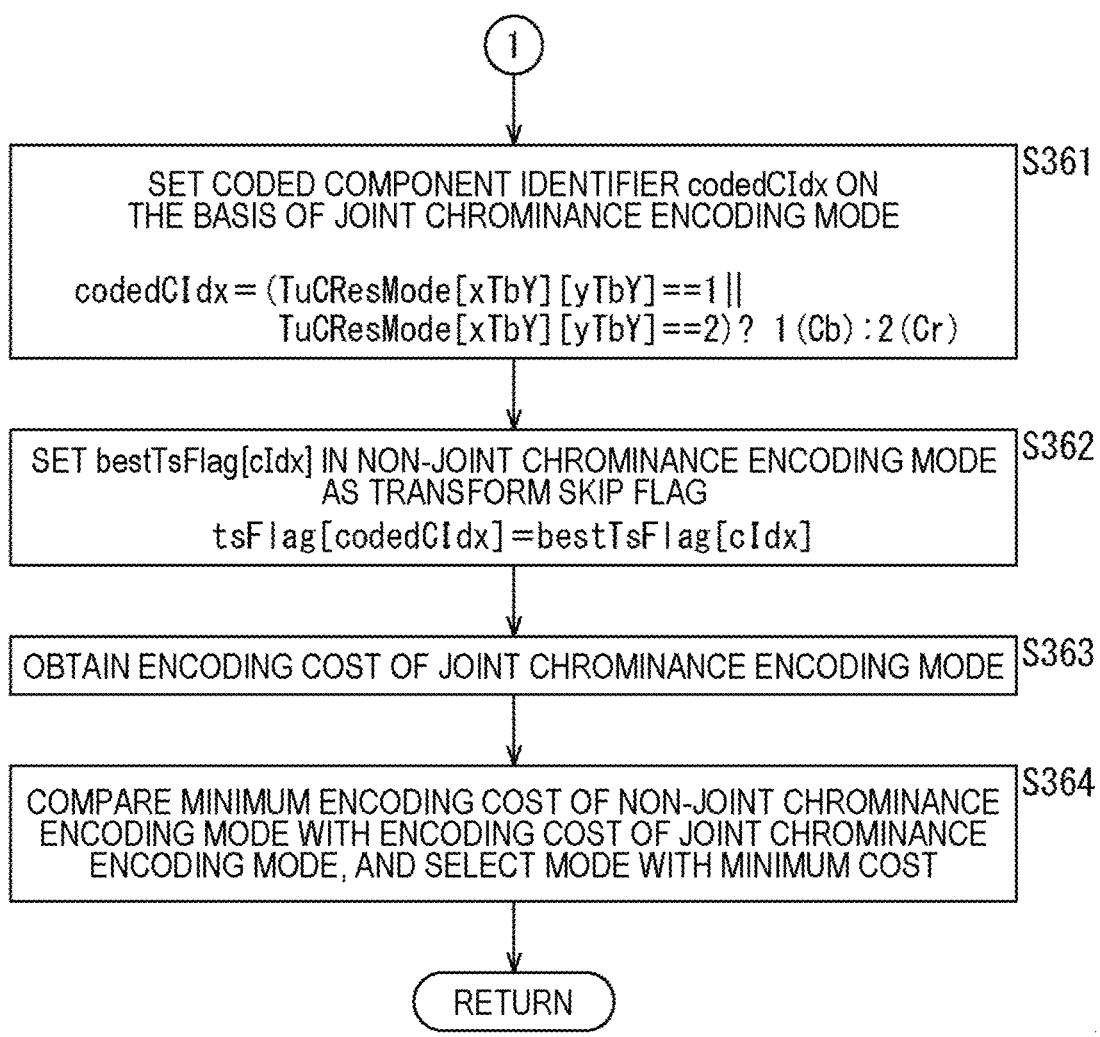
FIG. 6 is a flowchart that follows FIG. 5, illustrating an example of a flow of the encoding mode setting processing.

When the processing of step S354 ends, the processing proceeds to FIG. 6. In step S361 of FIG. 6, the control unit 301 sets a coded component identifier codedCIdx on the basis of the joint chrominance encoding mode set in step S354. For example, the control unit 301 sets codedCIdx to "1" (that is, Cb) in a case where TuCResMode[xTbY][yTbY] is "1" or "2", and sets codedCIdx to "2" (that is, Cr) in the other cases.

In step S362, the control unit 301 sets bestTsFlag[cIdx] set in step S353 to the transform skip flag tsFlag[codedCIdx] in the joint chrominance encoding mode (tsFlag[codedCIdx]=bestTsFlag[cIdx]).

In step S363, the control unit 301 derives the encoding cost of the joint chrominance encoding mode. As described above, in step S362, the value of the transform skip flag corresponding to the transform type with the minimum encoding cost in the non-joint chrominance encoding mode is set to the transform skip flag in the joint chrominance encoding mode. Therefore, for the joint chrominance encoding mode, the control unit 301 is only required to derive the encoding cost of the mode corresponding to the value of the transform skip flag. That is, in this case, the control unit 301 does not need to derive the encoding costs for both the case of applying the transform skip and the case of not applying the transform skip. Therefore, the control unit 301 can more easily derive the encoding cost for the joint chrominance mode.

In step S364, the control unit 301 compares the minimum encoding cost of the non-joint chrominance encoding mode with the encoding cost of the joint chrominance encoding mode, and selects the mode with the minimum encoding cost.

Figure 4:
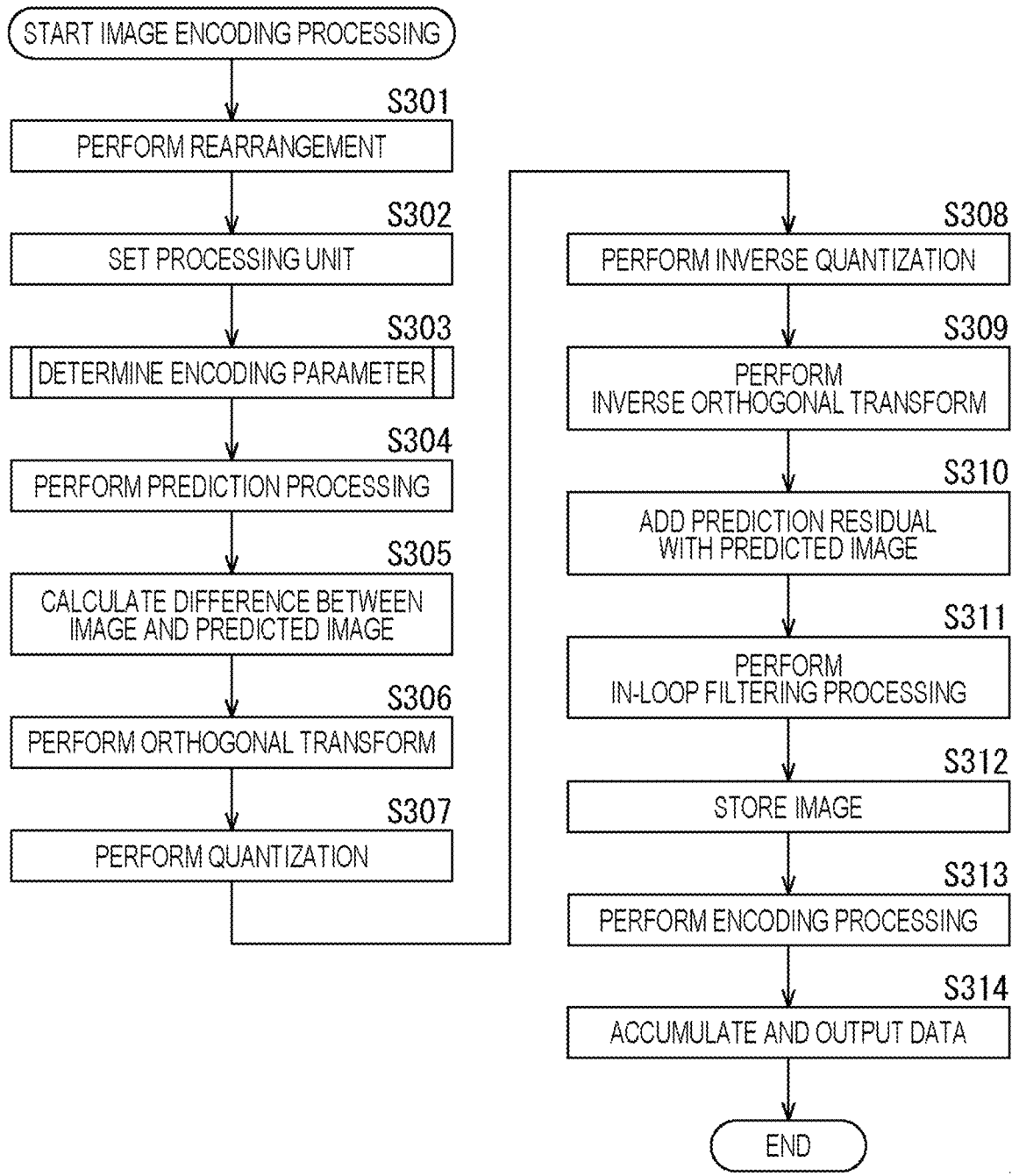
FIG. 4 is a flowchart illustrating an example of a flow of image encoding processing.
Figure 5:
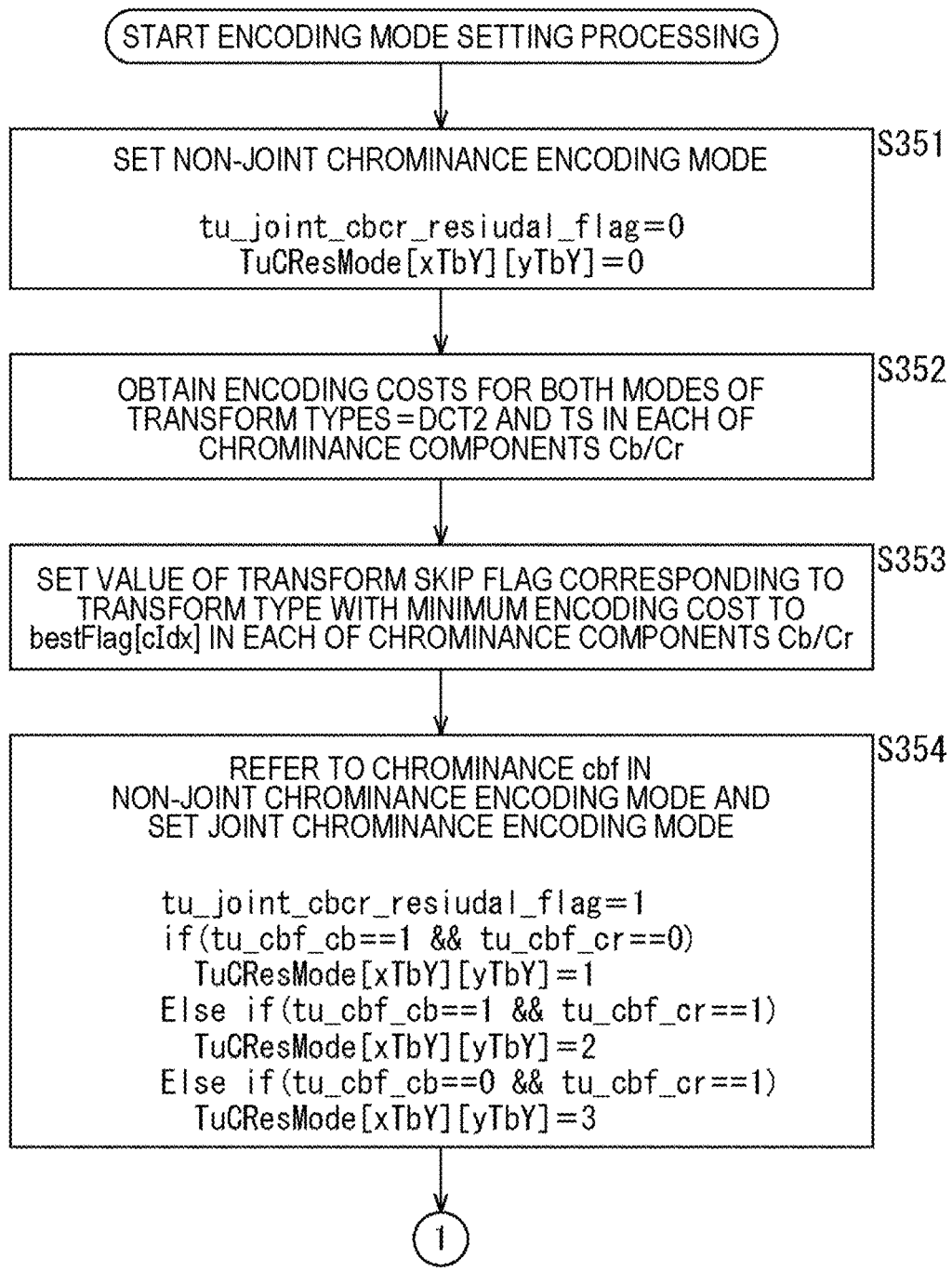
FIG. 5 is a flowchart illustrating an example of a flow of encoding mode setting processing.

When the processing of step S364 ends, the encoding mode setting processing ends, and the processing returns to FIG. 4.

By doing so, the image encoding device 300 can suppress an increase in the encoding complexity and can suppress an increase in the encoding load as compared with the case of not limiting the application of the chrominance transform skip in the joint chrominance encoding mode as described in Non-Patent Document 1. Therefore, for example, the image encoding device 300 can set the transform type at a high speed. Furthermore, an increase in cost of the image encoding device 300 can be suppressed.

In addition, the image encoding device 300 can suppress reduction in encoding efficiency as compared with the case of limiting the application of the transform skip in the joint chrominance encoding mode as described in Non-Patent Document 2.

3. Second Embodiment

<Image Decoding Device>

Figure 7:
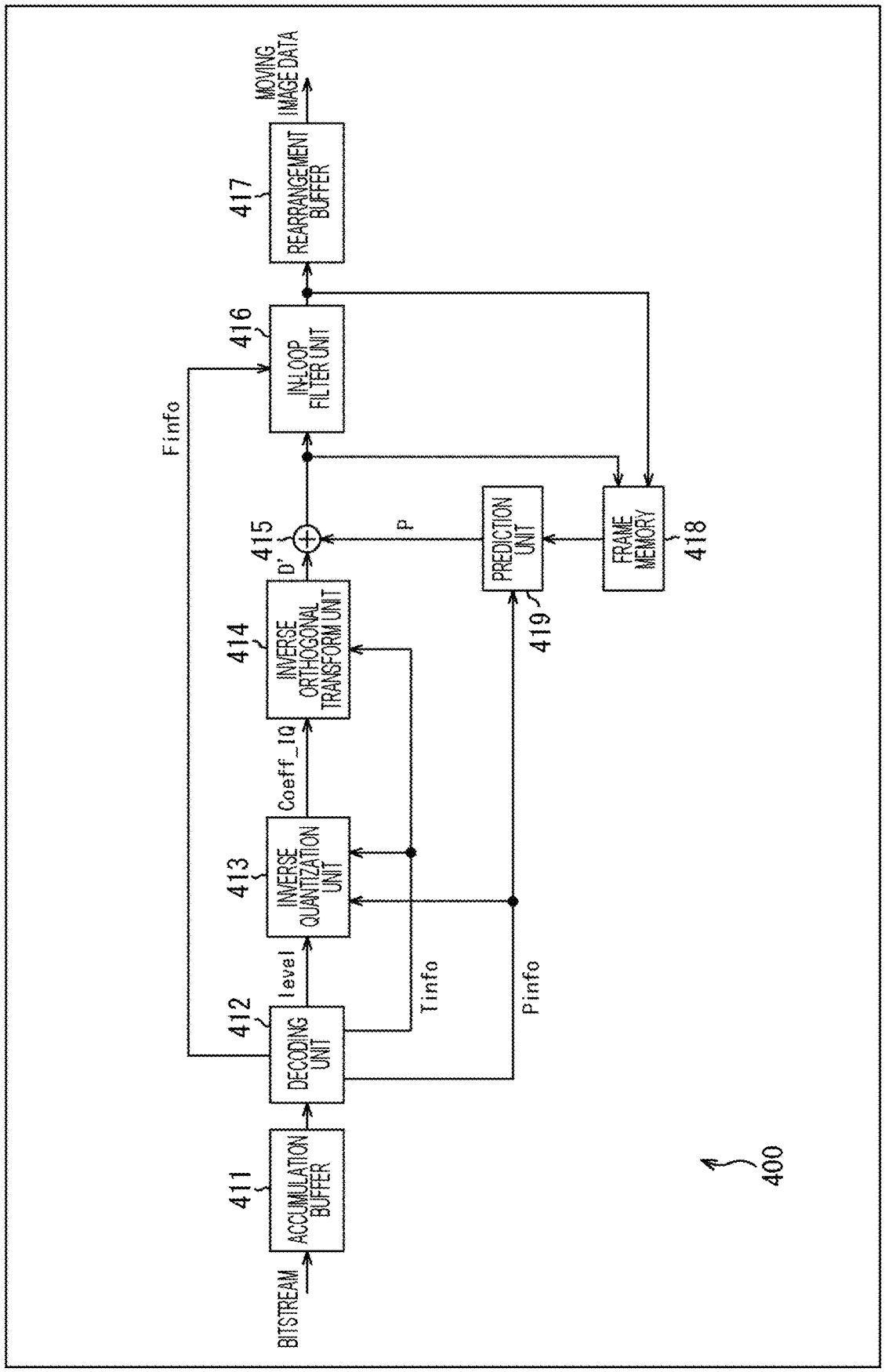
FIG. 7 is a block diagram illustrating a main configuration example of an image decoding device.

FIG. 7 is a block diagram illustrating an example of a configuration of an image decoding device as one mode of an image processing device to which the present technology is applied. An image decoding device 400 illustrated in FIG. 7 is a device that encodes coded data of a moving image. For example, the image decoding device 400 can decode the coded data by a decoding method described in any one of the above Non-Patent Documents. For example, the image decoding device 400 decodes the coded data (bitstream) generated by the above-described image encoding device 300.

Note that FIG. 7 illustrates main processing units (blocks), data flows, and the like, and those illustrated in FIG. 7 are not necessarily everything. That is, in the image decoding device 400, there may be a processing unit not illustrated as a block in FIG. 7, or processing or data flow not illustrated as an arrow or the like in FIG. 7.

In FIG. 7, the image decoding device 400 includes an accumulation buffer 411, a decoding unit 412, an inverse quantization unit 413, an inverse orthogonal transform unit 414, a calculation unit 415, an in-loop filter unit 416, a rearrangement buffer 417, a frame memory 418, and a prediction unit 419. Note that the prediction unit 419 includes an intra prediction unit and an inter prediction unit (not illustrated). The image decoding device 400 is a device for generating moving image data by decoding coded data (bitstream).

<Accumulation Buffer>

The accumulation buffer 411 acquires the bitstream input to the image decoding device 400 and holds (stores) the bitstream. The accumulation buffer 411 supplies the accumulated bitstream to the decoding unit 412 at predetermined timing or in a case where a predetermined condition is satisfied, for example.

<Decoding Unit>

The decoding unit 412 executes processing for decoding an image. For example, the decoding unit 412 acquires the bitstream supplied from the accumulation buffer 411. For example, the decoding unit 412 performs variable length decoding for a syntax value of each syntax element from a bit string according to a definition of a syntax table to derive a parameter.

The parameter derived from the syntax element and the syntax value of the syntax element includes, for example, information such as header information Hinfo, prediction mode information Pinfo, transform information Tinfo, residual information Rinfo, and filter information Finfo. That is, the decoding unit 412 parses (analyzes and acquires)

such information from the bitstream. These pieces of information will be described below.

<Header Information Hinfo>

The header information Hinfo includes, for example, header information such as a video parameter set (VPS), a sequence parameter set (SPS), a picture parameter set (PPS), and a slice header (SH). The header information Hinfo includes, for example, information defining image size (width PicWidth and height PicHeight), bit depth (luminance bitDepthY and chrominance bitDepthC), a chrominance array type ChromaArrayType, maximum value MaxCUSize and minimum value MinCUSize of CU size, maximum depth MaxQTDepth and minimum depth MinQTDepth of quad-tree division, maximum depth MaxBTDepth and minimum depth MinBTDepth of binary-tree division, a maximum value MaxTSSize of a transform skip block (also called maximum transform skip block size), an on/off flag of each encoding tool (also called enabled flag), and the like.

For example, an example of the on/off flag of the encoding tool included in the header information Hinfo includes an on/off flag related to transform processing and quantization processing below. Note that the on/off flag of the encoding tool can also be interpreted as a flag indicating whether or not a syntax related to the encoding tool exists in the coded data. A case where a value of the on/off flag is 1 (true) indicates that the encoding tool can be used. A case where the value of the on/off flag is 0 (false) indicates that the encoding tool cannot be used. Note that the interpretation of the flag value may be reversed.

For example, the header information Hinfo may include an inter-component prediction enabled flag (ccp_enabled_flag). The inter-component prediction enabled flag is flag information indicating whether or not inter-component prediction (cross-component prediction (CCP), also referred to as CC prediction) is available. For example, in a case where the flag information is "1" (true), the flag information indicates that the inter-component prediction is available. In a case where the flag information is "0" (false), the flag information indicates that the inter-component prediction is not available.

Note that this CCP is also referred to as inter-component linear prediction (CCLM or CCLMP).

<Prediction Mode Information Pinfo>

The prediction mode information Pinfo includes, for example, information such as size information PBSize (prediction block size) of a prediction block (PB) to be processed, intra prediction mode information IPinfo, and motion prediction information MVinfo.

The intra prediction mode information IPinfo includes, for example, prev_intra_luma_pred_flag, mpm_idx, and rem_intra_pred_mode in JCTVC-W1005, 7.3.8.5 Coding Unit syntax, a luminance intra prediction mode IntraPredModeY derived from the syntax, and the like.

Furthermore, the intra prediction mode information IPinfo may include, for example, an inter-component prediction flag (ccp_flag (cclmp_flag)). The inter-component prediction flag (ccp_flag (cclmp_flag)) is flag information indicating whether or not to apply inter-component linear prediction. For example, ccp_flag==1 indicates that inter-component prediction is applied, and ccp_flag==0 indicates that the inter-component prediction is not applied.

Furthermore, the intra prediction mode information IPinfo may include a multi-class linear prediction mode flag (mclm_flag). The multi-class linear prediction mode flag (mclm_flag) is information regarding a linear prediction mode (linear prediction mode information). More specifically, the multi-class linear prediction mode flag (mclm_flag) is flag information indicating whether or not to set a multi-class linear prediction mode. For example, "0" indicates one-class mode (single class mode) (for example, CCLMP), and "1" indicates two-class mode (multi-class mode) (for example, MCLMP).

Moreover, the intra prediction mode information IPinfo may include a chrominance sample position type identifier (chroma_sample_loc_type_idx). The chrominance sample position type identifier (chroma_sample_loc_type_idx) is an identifier for identifying a type of a pixel position of a chrominance component (also referred to as a chrominance sample position type). For example, in a case where the chrominance array type (ChromaArrayType), which is information regarding a color format, indicates 420 format, the chrominance sample position type identifier is assigned as in the following expression.

$$\text{chroma\_sample\_loc\_type\_idx}==0:\text{Type2}$$

$$\text{chroma\_sample\_loc\_type\_idx}==1:\text{Type3}$$

$$\text{chroma\_sample\_loc\_type\_idx}==2:\text{Type0}$$

$$\text{chroma\_sample\_loc\_type\_idx}==3:\text{Type1}$$

Note that the chrominance sample position type identifier (chroma_sample_loc_type_idx) is transmitted as (by being stored in) information (chroma_sample_loc_info( )) regarding the pixel position of the chrominance component (that is, stored in information regarding the pixel position of the chrominance component).

Furthermore, the intra prediction mode information IPinfo may include a chrominance MPM identifier (chroma_mpm_idx). The chrominance MPM identifier (chroma_mpm_idx) is an identifier indicating which prediction mode candidate in a chrominance intra prediction mode candidate list (intraPredModeCandListC) is to be specified as a chrominance intra prediction mode.

Moreover, the intra prediction mode information IPinfo may include a luminance intra prediction mode (IntraPredModeC) derived from these syntaxes.

The motion prediction information MVinfo includes, for example, information such as merge_idx, merge_flag, inter_pred_idc, ref_idx_LX, mvp_lX_flag, X={0, 1}, mvd, and the like (see, for example, JCTVC-W1005, 7.3.8.6 Prediction Unit Syntax).

Of course, the information included in the prediction mode information Pinfo is arbitrary, and information other than the above information may be included.

<Transform Information Tinfo>

The transform information Tinfo may include, for example, a width size TBWSize and a height TBHSize of a transform block to be processed. Note that a logarithmic value log 2TBWSize having a base of 2 may be applied instead of the width size TBWSize of the transform block to be processed. Furthermore, a logarithmic value log 2TBHSize having a base of 2 may be applied instead of the height TBHSize of the transform block to be processed.

Furthermore, the transform information Tinfo may include a transform skip flag (transform_skip_flag (or ts flag)). The transform skip flag is a flag indicating whether or not to skip the coefficient transform (or inverse coefficient transform). Note that this transform skip flag may be signaled for each component of Y, Cb, and Cr (transform_skip_flag[0], transform_skip_flag[1], and transform_skip_flag[2]).

Moreover, the transform information Tinfo may include parameters such as a scan identifier (scanIdx), a quantization parameter (qp), and a quantization matrix (scaling_matrix (for example, JCTVC-W1005, 7.3.4 Scaling list data syntax)).

Of course, the information included in the transform information Tinfo is arbitrary, and information other than the above information may be included:

<Residual Information Rinfo>

The residual information Rinfo (see, for example, 7.3.8.11 Residual Coding syntax of JCTVC-W1005) may include, for example, a residual data presence/absence flag (cbf (coded_block_flag)). Furthermore, the residual information Rinfo may include last non-zero coefficient X coordinate (last_sig_coeff_x_pos) and last non-zero coefficient Y coordinate (last_sig_coeff_y_pos). Moreover, the residual information Rinfo may include a subblock non-zero coefficient presence/absence flag (coded_sub_block_flag) and a non-zero coefficient presence/absence flag (sig_coeff_flag).

Furthermore, the residual information Rinfo may include a GR1 flag (gr1_flag) that is a flag indicating whether the level of the non-zero coefficient is greater than 1, and a GR2 flag (gr2_flag) that is a flag indicating whether the level of the non-zero coefficient is greater than 2. Moreover, the residual information Rinfo may include a sign code (sign_flag) that is a sign indicating positive or negative of the non-zero coefficient. Furthermore, the residual information Rinfo may include a non-zero coefficient residual level (coeff_abs_level_remaining) that is a residual level of the non-zero coefficient.

Of course, the information included in the residual information Rinfo is arbitrary, and information other than the above information may be included.

<Filter Information Finfo>

The filter information Finfo includes control information regarding filter processing. For example, the filter information Finfo may include control information regarding a deblocking filter (DBF). Furthermore, the filter information Finfo may include control information regarding a pixel-adaptive offset (SAO). Moreover, the filter information Finfo may include control information regarding an adaptive loop filter (ALF). Furthermore, the filter information Finfo may include control information regarding other linear filters and non-linear filters.

For example, the filter information Finfo may include a picture to which each filter is applied and information specifying a region in the picture. Furthermore, the filter information Finfo may include filter On control information or Off control information in units of CUs. Moreover, the filter information Finfo may include filter On control information or Off control information regarding a boundary of a slice or a tile.

Of course, the information included in the filter information Finfo is arbitrary, and information other than the above information may be included.

Return to the description of the decoding unit 412. The decoding unit 412 refers to the residual information Rinfo and derives a quantized transform coefficient level level at each coefficient position in each transform block. The decoding unit 412 supplies the quantized transform coefficient level level to the inverse quantization unit 413.

Furthermore, the decoding unit 412 supplies the parsed header information Hinfo, prediction mode information Pinfo, quantized transform coefficient level level, transform information Tinfo, and filter information Finfo to each block. Specific description is given as follows.

The header information Hinfo is supplied to the inverse quantization unit 413, the inverse orthogonal transform unit 414, the prediction unit 419, and the in-loop filter unit 416.

The prediction mode information Pinfo is supplied to the inverse quantization unit 413 and the prediction unit 419. The transform information Tinfo is supplied to the inverse quantization unit 413 and the inverse orthogonal transform unit 414. The filter information Finfo is supplied to the in-loop filter unit 416.

Of course, the above example is an example, and the present embodiment is not limited to this example. For example, each encoding parameter may be supplied to an arbitrary processing unit. Furthermore, other information may be supplied to an arbitrary processing unit.

<Inverse Quantization Unit>

The inverse quantization unit 413 executes processing regarding inverse quantization. For example, the inverse quantization unit 413 acquires the transform information Tinfo and the quantized transform coefficient level level supplied from the decoding unit 412. Furthermore, the inverse quantization unit 413 scales (inversely quantizes) a value of the quantized transform coefficient level level to derive a transform coefficient Coeff_IQ after inverse quantization on the basis of the transform information Tinfo.

Note that this inverse quantization is executed as inverse processing of the quantization by the quantization unit 314 of the image encoding device 300. Furthermore, the inverse quantization is processing similar to the inverse quantization performed by the inverse quantization unit 317 of the image encoding device 300. In other words, the inverse quantization unit 317 executes processing (inverse quantization) similar to that of the inverse quantization unit 413.

The inverse quantization unit 413 supplies the derived transform coefficient Coeff_IQ to the inverse orthogonal transform unit 414.

<Inverse Orthogonal Transform Unit>

The inverse orthogonal transform unit 414 executes processing regarding inverse orthogonal transform. For example, the inverse orthogonal transform unit 414 acquires the transform coefficient Coeff_IQ supplied from the inverse quantization unit 413. Furthermore, the inverse orthogonal transform unit 414 acquires the transform information Tinfo supplied from the decoding unit 412.

The inverse orthogonal transform unit 414 executes inverse orthogonal transform processing for the transform coefficient Coeff_IQ on the basis of the transform information Tinfo to derive a prediction residual D'. For example, the inverse orthogonal transform unit 414 performs inverse secondary transform for the transform coefficient Coeff_IQ to generate a primary transform coefficient. Furthermore, the inverse orthogonal transform unit 414 performs inverse primary transform for the primary transform coefficient to generate the prediction residual D'.

Note that this inverse orthogonal transform is executed as inverse processing of the orthogonal transform by the orthogonal transform unit 313 of the image encoding device 300. Furthermore, the inverse orthogonal transform is processing similar to the inverse orthogonal transform performed by the inverse orthogonal transform unit 318 of the image encoding device 300. That is, the inverse orthogonal transform unit 318 executes processing (inverse orthogonal transform) similar to the inverse orthogonal transform unit 414.

The inverse orthogonal transform unit 414 supplies the derived prediction residual D' to the calculation unit 415.

<Calculation Unit>

The calculation unit 415 executes processing regarding addition of information regarding an image. For example, the calculation unit 415 acquires the prediction residual D' supplied from the inverse orthogonal transform unit 414.

Furthermore, the calculation unit 415 acquires a predicted image P supplied from the prediction unit 419. The calculation unit 415 adds the prediction residual D' and the predicted image P (prediction signal) corresponding to the prediction residual D' to derive a locally decoded image Rlocal, as illustrated in the following expression.

$$Rlocal = D' + P$$

The calculation unit 415 supplies the derived locally decoded image Rlocal to the in-loop filter unit 416 and the frame memory 418.

<In-Loop Filter Unit>

The in-loop filter unit 416 executes processing regarding in-loop filtering processing. For example, the in-loop filter unit 416 acquires the locally decoded image Rlocal supplied from the calculation unit 415. Furthermore, the in-loop filter unit 416 acquires the filter information Finfo supplied from the decoding unit 412. Note that the information input to the in-loop filter unit 416 is arbitrary, and information other than the aforementioned information may be input.

The in-loop filter unit 416 appropriately executes filtering processing for the locally decoded image Rlocal on the basis of the filter information Finfo. For example, the in-loop filter unit 416 can apply a bilateral filter as the filtering processing. Furthermore, the in-loop filter unit 416 can apply a deblocking filter as the filtering processing. Moreover, the in-loop filter unit 416 can apply an adaptive offset filter as the filtering processing. Furthermore, the in-loop filter unit 416 can apply an adaptive loop filter as the filtering processing. Moreover, the in-loop filter unit 416 can apply a plurality of filters among the above filters in combination as the filtering processing. Note that which filter is applied and in which order the filters are applied are arbitrary and can be selected as appropriate. For example, the in-loop filter unit 416 applies the four in-loop filters of the bilateral filter, the deblocking filter, the adaptive offset filter, and the adaptive loop filter in this order as the filtering processing.

The in-loop filter unit 416 executes filtering processing corresponding to the filtering processing executed on the encoding side (for example, by the in-loop filter unit 320 of the image encoding device 300). Of course, the filtering processing executed by the in-loop filter unit 416 is arbitrary and is not limited to the above example. For example, the in-loop filter unit 416 may apply a Wiener filter or the like.

The in-loop filter unit 416 supplies the filtered locally decoded image Rlocal to the rearrangement buffer 417 and the frame memory 418.

<Rearrangement Buffer>

The rearrangement buffer 417 receives the locally decoded image Rlocal supplied from the in-loop filter unit 416 as an input and holds (stores) the locally decoded image Rlocal. The rearrangement buffer 417 reconstructs a decoded image R for each unit of picture, using the locally decoded image Rlocal, and holds (stores) the decoded image R (in the buffer). The rearrangement buffer 417 rearranges the obtained decoded images R from a decoding order to a reproduction order. The rearrangement buffer 417 outputs a rearranged decoded image R group to the outside of the image decoding device 400 as moving image data.

<Frame Memory>

The frame memory 418 executes processing regarding storage of data related to an image. For example, the frame memory 418 acquires the locally decoded image Rlocal supplied from the calculation unit 415. Then, the frame memory 418 reconstructs the decoded image R for each picture unit using the locally decoded image Rlocal. The frame memory 418 stores the reconstructed decoded image R in a buffer in the frame memory 418.

Furthermore, the frame memory 418 acquires the in-loop filtered locally decoded image Rlocal supplied from the in-loop filter unit 416. Then, the frame memory 418 reconstructs the decoded image R for each picture unit using the in-loop filtered locally decoded image Rlocal. The frame memory 418 stores the reconstructed decoded image R in a buffer in the frame memory 418.

Moreover, the frame memory 418 appropriately supplies the stored decoded image R (or a part thereof) to the prediction unit 419 as a reference image.

Note that the frame memory 418 may store the header information Hinfo, the prediction mode information Pinfo, the transform information Tinfo, the filter information Finfo, and the like related to generation of the decoded image.

<Prediction Unit>

The prediction unit 419 executes processing regarding generation of a predicted image. For example, the prediction unit 419 acquires the prediction mode information Pinfo supplied from the decoding unit 412. Furthermore, the prediction unit 419 executes prediction processing by a prediction method specified by the prediction mode information Pinfo to derive the predicted image P. At the time of derivation, the prediction unit 419 uses the decoded image R (or a part thereof) stored in the frame memory 418, the decoded image R being specified by the prediction mode information Pinfo, as the reference image. The decoded image R may be an image before filtering or after filtering. The prediction unit 419 supplies the derived predicted image P to the calculation unit 415.

Configuration Example

Note that these processing units (the accumulation buffer 411 to the prediction unit 419) have an arbitrary configuration. For example, each processing unit may be configured by a logic circuit that implements the above-described processing. Furthermore, each processing unit may include, for example, a CPU, a ROM, a RAM, and the like, and implement the above-described processing by executing a program using the above resources. Of course, each processing unit may have both the configurations and implement part of the above-described processing by the logic circuit and implement the other of the processing by executing the program. The configurations of the processing units may be independent of each other. For example, some of the processing units may implement part of the above-described processing by the logic circuit, some of the processing units may implement the above-described processing by executing the program, and some of the processing units may implement the above-described processing by both the logic circuit and execution of the program.

<Flow of Image Decoding Processing>

Figure 8:
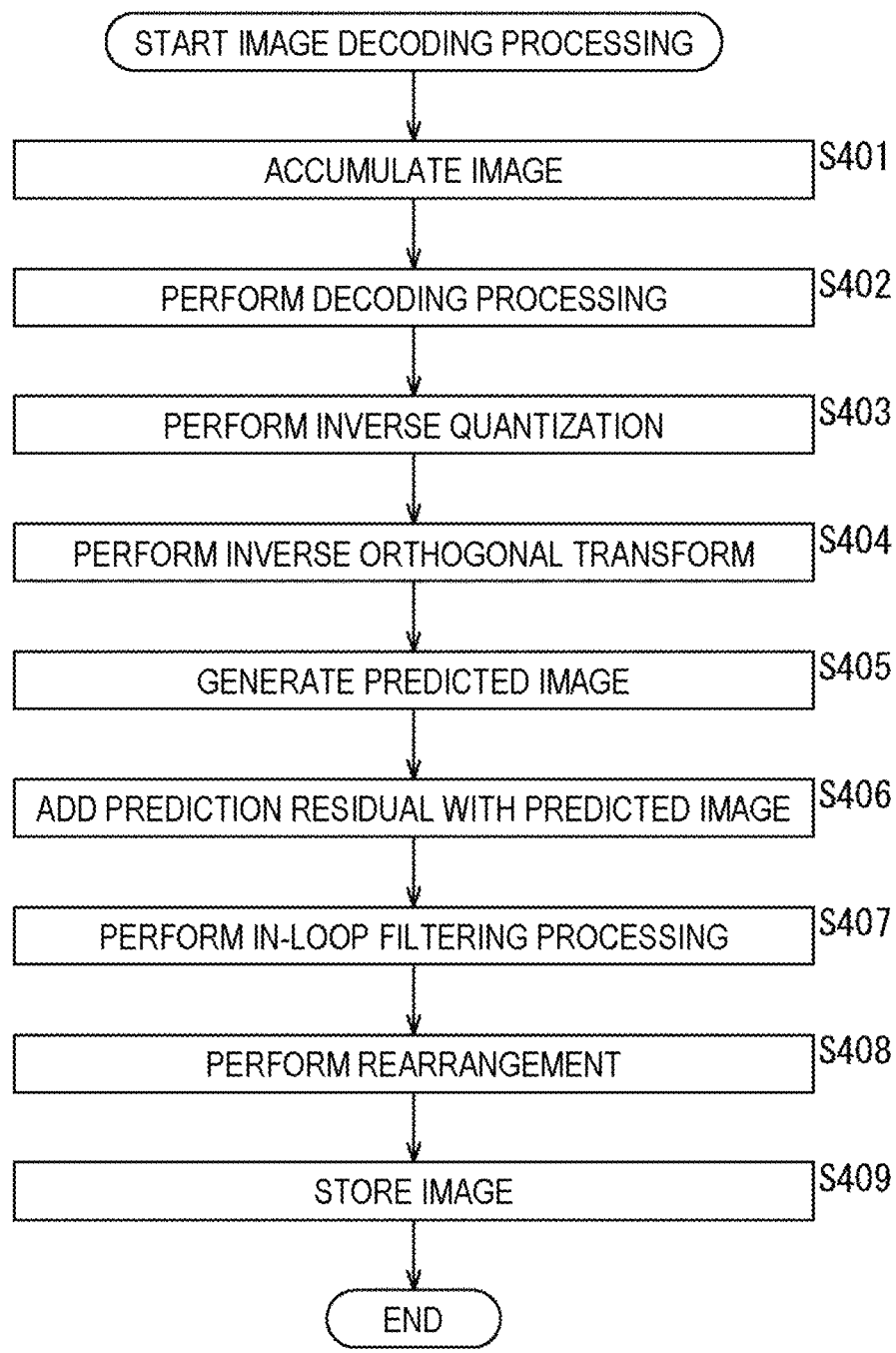
FIG. 8 is a flowchart illustrating an example of a flow of image decoding processing.

Next, an example of a flow of image decoding processing executed by the image decoding device 400 having the above configuration will be described with reference to a flowchart of FIG. 8.

When the image decoding processing is started, in step S401, the accumulation buffer 411 acquires and holds (accumulates) the coded data (bitstream) supplied from the outside of the image decoding device 400.

In step S402, the decoding unit 412 decodes the coded data (bitstream) to obtain a quantized transform coefficient level level. Furthermore, the decoding unit 412 parses (analyzes and acquires) various encoding parameters from the coded data (bitstream) by this decoding.

In step S403, the inverse quantization unit 413 executes inverse quantization that is inverse processing of the quantization executed on the encoding side for the quantized transform coefficient level level obtained by the processing in step S402 to obtain the transform coefficient Coeff_IQ.

In step S404, the inverse orthogonal transform unit 414 executes inverse orthogonal transform processing that is inverse processing of the orthogonal transform processing executed on the encoding side for the transform coefficient Coeff_IQ obtained in step S403 to obtain the prediction residual D'. For example, the inverse orthogonal transform unit 414 performs inverse secondary transform for the transform coefficient Coeff_IQ (secondary transform coefficient) to generate a primary transform coefficient. Furthermore, the inverse orthogonal transform unit 414 performs inverse primary transform for the primary transform coefficient to generate the prediction residual D'.

In step S405, the prediction unit 419 executes the prediction processing by a prediction method specified on the encoding side on the basis of the information parsed in step S402, and generates the predicted image P, for example, by reference to the reference image stored in the frame memory 418.

In step S406, the calculation unit 415 adds the prediction residual D' obtained in step S404 and the predicted image P obtained in step S405 to derive the locally decoded image Rlocal.

In step S407, the in-loop filter unit 416 executes the in-loop filtering processing for the locally decoded image Rlocal obtained by the processing in step S406.

In step S408, the rearrangement buffer 417 derives a decoded image R, using the "filtered locally decoded image Rlocal" obtained by the processing in step S407, and rearranges a decoded image R group from the decoding order to the reproduction order. The decoded image R group rearranged in the reproduction order is output to the outside of the image decoding device 400 as a moving image.

Furthermore, in step S409, the frame memory 418 stores at least one of the locally decoded image Rlocal obtained by the processing in step S406, and the locally decoded image Rlocal after filtering processing obtained by the processing in step S407.

When the processing in step S409 ends, the image decoding processing ends.

4. Supplement

<Computer>

The above-described series of processing can be executed by hardware or by software. In the case of executing the series of processing by software, a program that configures the software is installed in a computer. Here, the computer includes a computer incorporated in dedicated hardware, a computer, for example, general-purpose personal computer, capable of executing various functions by installing various programs, and the like.

Figure 9:
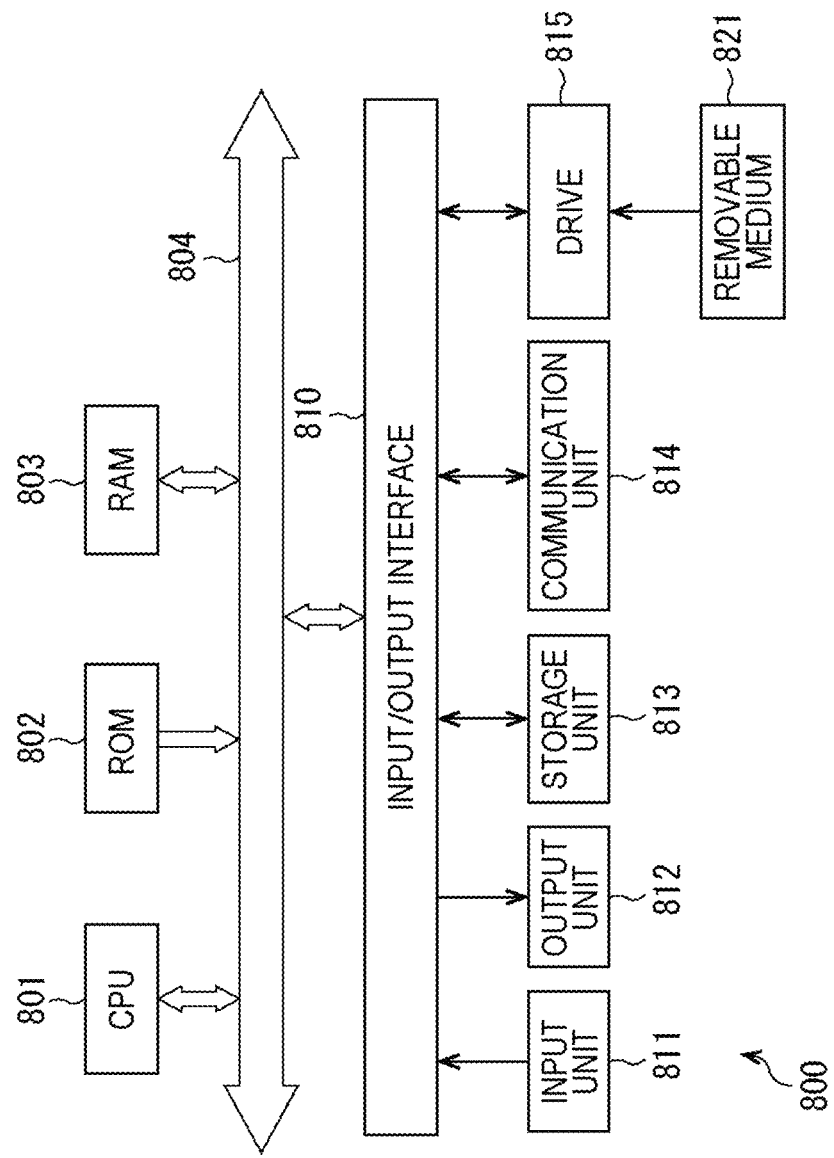
FIG. 9 is a block diagram illustrating a main configuration example of a computer.

FIG. 9 is a block diagram illustrating a configuration example of hardware of a computer that executes the above-described series of processing by a program.

In a computer 800 illustrated in FIG. 9, a central processing unit (CPU) 801, a read only memory (ROM) 802, and a random access memory (RAM) 803 are mutually connected by a bus 804.

An input/output interface 810 is also connected to the bus 804. An input unit 811, an output unit 812, a storage unit 813, a communication unit 814, and a drive 815 are connected to the input/output interface 810.

The input unit 811 includes, for example, a keyboard, a mouse, a microphone, a touch panel, an input terminal, and the like. The output unit 812 includes, for example, a display, a speaker, an output terminal, and the like. The storage unit 813 includes, for example, a hard disk, a RAM disk, a nonvolatile memory, and the like. The communication unit 814 includes, for example, a network interface. The drive 815 drives a removable medium 821 such as a magnetic disk, an optical disk, a magneto-optical disk, or a semiconductor memory.

In the computer configured as described above, the CPU 801 loads, for example, a program stored in the storage unit 813 into the RAM 803 and executes the program via the input/output interface 810 and the bus 804, so that the above-described series of processing is executed. Furthermore, the RAM 803 appropriately stores data and the like necessary for the CPU 801 to execute the various types of processing.

The program to be executed by the computer can be recorded and applied on the removable medium 821 as a package medium or the like, for example, and can be provided. In that case, the program can be installed to the storage unit 813 via the input/output interface 810 by attaching the removable medium 821 to the drive 815.

Furthermore, this program can be provided via a wired or wireless transmission medium such as a local area network, the Internet, or digital satellite broadcast. In that case, the program can be received by the communication unit 814 and installed in the storage unit 813.

Other than the above method, the program can be installed in the ROM 802 or the storage unit 813 in advance.

Applicable Object of Present Technology

The present technology can be applied to any image encoding method. That is, specifications of various types of processing regarding image encoding such as transform (inverse transform), quantization (inverse quantization), encoding, and prediction are arbitrary and are not limited to the above-described examples as long as no contradiction occurs with the above-described present technology. Furthermore, part of the processing may be omitted as long as no contradiction occurs with the above-described present technology.

Furthermore, the present technology can be applied to a multi-view image encoding system (or multi-view image decoding system) that executes encoding or decoding of a multi-view image including images of a plurality of viewpoints (views). In this case, the present technology is only required to be simply applied to encoding and decoding of each viewpoint (view).

Moreover, the present technology can be applied to a hierarchical image encoding (scalable encoding) system (or a hierarchical image decoding system) that encodes or decodes a hierarchical image that is multi-layered (hierarchized) so as to have a scalability function for a predetermined parameter. In this case, the present technology is only required to be simply applied to encoding/decoding of each layer (layer).

Furthermore, in the above description, the image encoding device 300 and the image decoding device 400 have been described as application examples of the present technology, but the present technology can be applied to an arbitrary configuration.

The present technology can be applied to, for example, various electron devices, such as transmitters and receivers (such as television receivers and mobile phones) in satellite broadcasting, cable broadcasting such as cable TV, distribution on the Internet, and distribution to terminals by cellular communication, or devices (for example, hard disk recorders and cameras) that record images on media such as optical disks, magnetic disks, and flash memories, and reproduce images from these storage media.

Furthermore, the present technology can be implemented as a configuration of a part of a device such as a processor (for example, a video processor) as a system large scale integration (LSI) or the like, a module (for example, a video module) using a plurality of processors or the like, a unit (for example, a video unit) using a plurality of modules or the like, or a set (for example, a video set) in which other functions are added to the unit (that is, a configuration of a part of the device).

Furthermore, for example, the present technology can also be applied to a network system including a plurality of devices. For example, the present technology may be implemented as cloud computing shared and processed in cooperation by a plurality of devices via a network. For example, the present technology may be implemented in a cloud service that provides a service regarding an image (moving image) to an arbitrary terminal such as a computer, an audio visual (AV) device, a portable information processing terminal, or an internet of things (IoT) device.

Note that, in this specification, the term "system" means a set of a plurality of configuration elements (devices, modules (parts), and the like), and whether or not all the configuration elements are in the same casing is irrelevant. Therefore, a plurality of devices housed in separate casings and connected via a network, and one device that houses a plurality of modules in one casing are both systems.

Field and Application to which the Present Technology is Applicable

The systems, devices, processing units, and the like to which the present technology is applied can be used in arbitrary fields such as traffic, medical care, crime prevention, agriculture, livestock industry, mining, beauty, factory, household appliance, weather, and natural surveillance, for example. Furthermore, uses thereof are also arbitrary.

For example, the present technology can be applied to systems and devices provided for providing content for appreciation and the like. Furthermore, for example, the present technology can also be applied to systems and devices used for traffic, such as traffic condition monitoring and automatic driving control. Moreover, for example, the present technology can also be applied to systems and devices provided for security. Furthermore, for example, the present technology can be applied to systems and devices provided for automatic control of machines and the like. Moreover, for example, the present technology can also be applied to systems and devices provided for agriculture or livestock industry. Furthermore, the present technology can also be applied to systems and devices that monitor nature states such as volcanoes, forests, and ocean, wildlife, and the like. Moreover, for example, the present technology can also be applied to systems and devices provided for sports.

Others

Note that the "flag" in the present specification is information for identifying a plurality of states, and includes not only information used for identifying two states of true (1) and false (0) but also information capable of identifying three or more states. Therefore, the value that the "flag" can take may be, for example, a binary value of 1/0 or may be a ternary value or more. That is, the number of bits constituting the "flag" is arbitrary, and may be 1 bit or a plurality of bits. Furthermore, the identification information (including flag) is assumed to be in not only a form of including the identification information in a bitstream but also a form of including difference information of the identification information from certain reference information in a bitstream. Therefore, in the present specification, the "flag" and "identification information" include not only the information itself but also the difference information for the reference information.

Furthermore, various types of information (metadata and the like) regarding coded data (bitstream) may be transmitted or recorded in any form as long as the various types of information are associated with the coded data. Here, the term "associate" means that, for example, one data can be used (linked) when the other data is processed. That is, data associated with each other may be collected as one data or may be individual data. For example, information associated with coded data (image) may be transmitted on a transmission path different from that of the coded data (image). Furthermore, for example, information associated with coded data (image) may be recorded on a different recording medium (or another recording area of the same recording medium) from the coded data (image). Note that this "association" may be a part of data instead of entire data. For example, an image and information corresponding to the image may be associated with each other in an arbitrary unit such as a plurality of frames, one frame, or a part in a frame.

Note that, in the present specification, terms such as "combining", "multiplexing", "adding", "integrating", "including", "storing", and "inserting" mean putting a plurality of things into one, such as putting coded data and metadata into one data, and means one method of the above-described "association".

Furthermore, embodiments of the present technology are not limited to the above-described embodiments, and various modifications can be made without departing from the gist of the present technology.

For example, the configuration described as one device (or processing unit) may be divided into and configured as a plurality of devices (or processing units). On the contrary, the configuration described as a plurality of devices (or processing units) may be collectively configured as one device (or processing unit). Furthermore, a configuration other than the above-described configuration may be added to the configuration of each device (or each processing unit). Moreover, a part of the configuration of a certain device (or processing unit) may be included in the configuration of another device (or another processing unit) as long as the configuration and operation of the system as a whole are substantially the same.

Furthermore, for example, the above-described program may be executed in an arbitrary device. In that case, the device is only required to have necessary functions (functional blocks and the like) and obtain necessary information.

Furthermore, for example, each step of one flowchart may be executed by one device, or may be shared and executed by a plurality of devices. Moreover, in a case where a plurality of processes is included in one step, the plurality of processes may be executed by one device, or may be shared and executed by a plurality of devices. In other words, the plurality of processes included in one step can be executed as processes of a plurality of steps. Conversely, the processing described as a plurality of steps can be collectively executed as one step.

The program executed by the computer may be configured such that, for example, processing of steps describing the program is executed in time series in the order described in the present specification. Furthermore, the program executed by the computer may be configured such that processing of steps describing the program is executed in parallel. Moreover, the program executed by the computer may be configured such that processing of steps describing the program is individually executed at necessary timing such as when called. That is, the processing of each step may be executed in an order different from the above-described order as long as no contradiction occurs. Moreover, the processing of the steps describing the program may be executed in parallel with the processing of another program, or may be executed in combination with the processing of another program.

Furthermore, for example, a plurality of techniques related to the present technology can be implemented independently as a single body as long as there is no contradiction. Of course, an arbitrary number of the present technologies can be implemented together. For example, part or whole of the present technology described in any of the embodiments can be implemented in combination with part or whole of the present technology described in another embodiment. Further, part or whole of the above-described arbitrary present technology can be implemented in combination with another technology not described above.

Note that the present technology can also have the following configurations.

(1) An image processing device including:
an encoding mode setting unit configured to set an encoding mode of encoding of an image by setting a transform type with a minimum encoding cost in a non-joint chrominance encoding mode as a transform type in a joint chrominance encoding mode, and deriving an encoding cost in the joint chrominance encoding mode.

(2) The image processing device according to (1), in which
the encoding mode setting unit executes setting regarding the joint chrominance encoding mode and setting of the transform type as the setting of the encoding mode.

(3) The image processing device according to (2), in which
the encoding mode setting unit sets whether or not to apply transform skip as the transform type in the joint chrominance encoding mode.

(4) The image processing device according to (3), in which,
in a case of not applying the transform skip, the encoding mode setting unit applies DCT2 as the transform type.

(5) The image processing device according to (3) or (4), in which
the encoding mode setting unit sets a value of a transform skip flag with a minimum encoding cost in the non-joint chrominance encoding mode to the transform skip flag in the joint chrominance encoding mode.

(6) The image processing device according to any one of (2) to (5), in which
the encoding mode setting unit sets the joint chrominance encoding mode on a basis of a chrominance encoding block flag in the non-joint chrominance encoding mode.

(7) The image processing device according to (6), in which
the encoding mode setting unit sets a coded component identifier on a basis of the set joint chrominance encoding mode.

(8) The image processing device according to any one of (1) to (7), in which
in the non-joint chrominance encoding mode, the encoding mode setting unit derives an encoding cost of each transform type, sets the transform type with the minimum encoding cost among the derived encoding costs, and sets the set transform type as the transform type in the joint chrominance encoding mode.

(9) The image processing device according to any one of (1) to (8), in which
the encoding mode setting unit compares a minimum encoding cost of the non-joint chrominance encoding mode with the encoding cost of the joint chrominance encoding mode, and selects a mode with the minimum encoding cost.

(10) The image processing device according to any one of (1) to (9), further including:
an orthogonal transform unit configured to orthogonally transform coefficient data of the image according to the encoding mode set by the encoding mode setting unit.

(11) The image processing device according to (10), further including:
an encoding unit configured to encode the coefficient data orthogonally transformed by the orthogonal transform unit according to the encoding mode set by the encoding mode setting unit.

(12) The image processing device according to (11), in which
the encoding mode setting unit sets a transform skip flag indicating whether or not to apply transform skip as the encoding mode, and
the encoding unit encodes the transform skip flag set by the encoding mode setting unit.

(13) The image processing device according to (11) or (12), further including:
a quantization unit configured to quantize the coefficient data orthogonally transformed by the orthogonal transform unit, in which
the encoding unit encodes the coefficient data quantized by the quantization unit.

(14) The image processing device according to any one of (10) to (13), further including:
a calculation unit configured to generate a residual between the image and a predicted image, in which
the orthogonal transform unit orthogonally transforms coefficient data of the residual.

(15) An image processing method including:
setting an encoding mode of encoding of an image by setting a transform type with a minimum encoding cost in a non-joint chrominance encoding mode as a transform type in a joint chrominance encoding mode, and deriving an encoding cost in the joint chrominance encoding mode.

REFERENCE SIGNS LIST

300 Image encoding device
301 Control unit
312 Calculation unit
313 Orthogonal transform unit
314 Quantization unit
315 Encoding unit

The invention claimed is:

1. An image processing device comprising:
circuitry configured to set an encoding mode of encoding of an image by
    setting a transform type with a minimum encoding cost in a non-joint chrominance encoding mode as a transform type in a joint chrominance encoding mode, and
    deriving an encoding cost in the joint chrominance encoding mode, wherein the circuitry is configured to
    compare the minimum encoding cost of the non-joint chrominance encoding mode with the encoding cost of the joint chrominance encoding mode, and
    select a mode with the minimum encoding cost.

2. The image processing device according to claim 1, wherein
the encoding mode setting unit executes setting regarding the joint chrominance encoding mode and setting of the transform type as the setting of the encoding mode.

3. The image processing device according to claim 2, wherein
the encoding mode setting unit sets whether or not to apply transform skip as the transform type in the joint chrominance encoding mode.

4. The image processing device according to claim 3, wherein,
in a case of not applying the transform skip, the encoding mode setting unit applies DCT2 as the transform type.

5. The image processing device according to claim 3, wherein
the encoding mode setting unit sets a value of a transform skip flag with a minimum encoding cost in the non-joint chrominance encoding mode to the transform skip flag in the joint chrominance encoding mode.

6. The image processing device according to claim 2, wherein
the encoding mode setting unit sets the joint chrominance encoding mode on a basis of a chrominance encoding block flag in the non-joint chrominance encoding mode.

7. The image processing device according to claim 6, wherein
the encoding mode setting unit sets a coded component identifier on a basis of the set joint chrominance encoding mode.

8. The image processing device according to claim 1, further comprising:
an orthogonal transform unit configured to orthogonally transform coefficient data of the image according to the encoding mode set by the encoding mode setting unit.

9. The image processing device according to claim 8, further comprising:
an encoding unit configured to encode the coefficient data orthogonally transformed by the orthogonal transform unit according to the encoding mode set by the encoding mode setting unit.

10. The image processing device according to claim 9, wherein
the encoding mode setting unit sets a transform skip flag indicating whether or not to apply transform skip as the encoding mode, and
the encoding unit encodes the transform skip flag set by the encoding mode setting unit.

11. The image processing device according to claim 9, further comprising:
a quantization unit configured to quantize the coefficient data orthogonally transformed by the orthogonal transform unit, wherein
the encoding unit encodes the coefficient data quantized by the quantization unit.

12. The image processing device according to claim 8, further comprising:
a calculation unit configured to generate a residual between the image and a predicted image, wherein
the orthogonal transform unit orthogonally transforms coefficient data of the residual.

13. An image processing method comprising:
setting an encoding mode of encoding of an image by
    setting a transform type with a minimum encoding cost in a non-joint chrominance encoding mode as a transform type in a joint chrominance encoding mode, and
    deriving an encoding cost in the joint chrominance encoding mode;
comparing the minimum encoding cost of the non-joint chrominance encoding mode with the encoding cost of the joint chrominance encoding mode; and
selecting a mode with the minimum encoding cost.

14. An image processing device comprising:
circuitry configured to set an encoding mode of encoding of an image by
    setting a transform type with a minimum encoding cost in a non-joint chrominance encoding mode as a transform type in a joint chrominance encoding mode, and
    deriving an encoding cost in the joint chrominance encoding mode, wherein the circuitry is configured to
    in the non-joint chrominance encoding mode, derive an encoding cost of each transform type, and set the transform type with the minimum encoding cost among the derived encoding costs, and
    sets the set transform type with the minimum encoding cost in the non-joint chrominance encoding mode as the transform type in the joint chrominance encoding mode.

* * * * *